United States Patent [19]

Keswani et al.

[11] Patent Number: 5,477,334
[45] Date of Patent: Dec. 19, 1995

[54] METHOD OF AND APPARATUS FOR DETERMINING IF A GIVEN DATA POINT FALLS WITHIN A POPULATION OF DATA POINTS

[75] Inventors: Santosh T. Keswani, Mayfield Heights, Ohio; Peter F. Bemis, Sheboygan; Steven J. Kolste, Sheboygan Falls, both of Wis.

[73] Assignee: Bemis Manufacturing Company, Sheboygan Falls, Wis.

[21] Appl. No.: 284,743

[22] Filed: Aug. 2, 1994

Related U.S. Application Data

[63] Continuation of Ser. No. 686,787, Apr. 17, 1991, abandoned.

[51] Int. Cl.$^6$ .............................. G01J 3/50; G01N 21/27
[52] U.S. Cl. ................................. 356/405; 364/526
[58] Field of Search .................... 356/405; 364/526, 364/552, 554

[56] References Cited

U.S. PATENT DOCUMENTS

| | | |
|---|---|---|
| 3,916,168 | 10/1975 | McCarty et al. . |
| 4,019,819 | 4/1977 | Lodzinski . |
| 4,203,671 | 5/1980 | Takahashi et al. . |
| 4,249,827 | 2/1981 | DiMatteo et al. . |
| 4,414,635 | 11/1983 | Gast et al. . |
| 4,464,677 | 8/1984 | Kuhn et al. . |
| 4,477,833 | 10/1984 | Clark et al. ............................. 358/80 |
| 4,511,989 | 4/1985 | Sakamoto ............................. 364/723 |
| 4,654,794 | 3/1987 | O'Brien . |
| 4,688,178 | 8/1987 | Connelly et al. . |
| 4,745,555 | 5/1988 | Connelly et al. . |
| 4,788,650 | 11/1988 | Willis et al. . |
| 4,812,904 | 3/1989 | Maring et al. . |
| 4,837,722 | 6/1989 | Sara ............................. 364/723 |
| 4,884,221 | 11/1989 | Sugiyama et al. . |
| 4,887,217 | 12/1989 | Sherman et al. . |
| 5,087,126 | 2/1992 | Pochieh ............................. 356/402 |
| 5,121,196 | 6/1992 | Hung ............................. 358/75 |
| 5,122,977 | 6/1992 | Pfeiffer . |
| 5,296,923 | 3/1994 | Hung ............................. 358/527 |

FOREIGN PATENT DOCUMENTS

| | | |
|---|---|---|
| 0382466 | 8/1990 | European Pat. Off. . |
| 3-18179 | 1/1991 | Japan . |
| 3018179 | 1/1991 | Japan . |
| 1595122 | 8/1981 | United Kingdom . |

OTHER PUBLICATIONS

Applied Multivariate Statistical Analysis, Richard A. Johnson and Dean W. Wichern, pp. 470–473, 480–483, 530–531.

*Primary Examiner*—F. L. Evans
*Attorney, Agent, or Firm*—Michael, Best & Friedrich

[57] ABSTRACT

A method of and apparatus for determining if a given data point having three parameters falls within a population defined by more than four known data points, each data point having the three parameters, the method and apparatus involving determining if the given data point falls within any of a plurality of tetrahedrons, each of the tetrahedrons having four vertices, each of the vertices of each tetrahedron being defined by one of the known data points.

66 Claims, 7 Drawing Sheets

5,477,334

METHOD OF AND APPARATUS FOR DETERMINING IF A GIVEN DATA POINT FALLS WITHIN A POPULATION OF DATA POINTS

CROSS REFERENCE TO RELATED APPLICATION

This is a continuation of U.S. patent application Ser. No. 07/686,787 filed Apr. 17, 1991, now abandoned.

BACKGROUND OF THE INVENTION

The invention relates to a method and apparatus for determining if an unfamiliar data point representing various parameters should be classified in a category (e.g. "acceptable"), given a population defined by known data points representing the same parameters, which known data points are considered to belong in that category with regard to those parameters.

The invention also has application in the field of color recognition (color analysis). Manufacturers of colored articles, for example, presently require pigment (or color dye) suppliers to provide samples of pigments to the manufacturer and/or to the buyer of the articles. A human being then visually determines which pigment is acceptable for the articles that the manufacturer is planning to manufacture. The pigment supplier then supplies the pigment to the manufacturer who then proceeds to manufacture the articles, possibly after first visually inspecting the pigment to ensure that it matches the sample. After the articles are manufactured, the finished article is again visually inspected for acceptability with regard to color. This is because during the manufacturing process, particularly if the process requires heat (such as in an injection molding process), an error in controlling the process may cause the color of the finished article to deviate from the desired color. The buyer of the finished article may also perform a visual inspection with regard to color. Each of the visual inspections performed before, during, and after the manufacture of the finished article involve subjectivity, and different color experts may have different opinions as to whether or not a colored article is acceptable with regard to color. Further, each visual inspection involves the cost of using a color expert.

The prior art provides algorithms for determining if a unfamiliar data point representing various parameters should be deemed "acceptable" given a population of data points that represent the various parameters and that have been determined to be "acceptable". With regard to color data points representing three parameters (for example, a red/green parameter (a*), a yellow/blue parameter (b*), and a lightness parameter (L*)), a prior art method for determining if an unfamiliar data point should be acceptable given a population of known acceptable data points would attempt to fit an ellipsoid around the known acceptable data points and would determine if the unfamiliar data point lies within the ellipsoid to determine if the unfamiliar data point should be acceptable. More particularly, since it is difficult to fit a three dimensional ellipsoid around known acceptable data points, the prior art method will usually define three ellipses, one in each of the three two-dimensional planes a*–b*, b*–L*, and a*–L*. The reason that an elliptical shape was used in the prior art method is that this shape takes into account the fact that a greater amount of deviation may be tolerable for one of the parameters than for another of the parameters. A problem with the prior art approach is that many known acceptable data points are required. The method will not work when there are only a few known acceptable data points. Another problem with this prior art approach is that the ellipsoid that is defined may include regions that would contain unacceptable data points.

Attention is directed to the following reference, which is incorporated herein by reference for background purposes, and which discusses some statistical techniques for solving classification problems:

Johnson, Richard A., and Dean W. Wichern, *Applied Multivariate Statistical Analysis*, Prentice Hall, Englewood Cliffs, N.J., Second Edition, pp. 470–531.

It should be noted that the techniques disclosed in *Applied Multivariate Statistical Analysis* generally are useful only for populations that are normally distributed.

SUMMARY OF THE INVENTION

The invention provides a method of determining if a given data point having at least three parameters falls within a population defined by at least four known data points, each known data point having at least the three parameters, the method comprising the following steps in order: defining a tetrahedron having four vertices, each of the vertices of the tetrahedron being defined by one of the known data points; and determining if the given data point lies within the tetrahedron.

One embodiment of the invention provides a method of determining if a given data point having at least three parameters falls within a population defined by more than four known data points, each known data point having the three parameters, the method comprising the step of determining if the given data point falls within any of a plurality of tetrahedrons, each of the tetrahedrons having four vertices, each of the vertices of each tetrahedron being defined by one of the known data points.

One embodiment of the invention provides a method of determining if a given data point, having a predetermined number n of parameters, falls within a population defined by at least n+1 known data points, each known data point having the n parameters, n being at least 2 the method comprising the following steps in orders defining a triangle having three vertices, each of the vertices of the triangle being defined by two of the parameters of respective ones of the known data points, the same two parameters being used to define each of the vertices; and determining if the given data point lies within the triangle with regard to the same two parameters.

One embodiment of the invention provides a method of determining if a given data point, having a predetermined number n of parameters, falls within a population defined by at least n+1 known data points, each known data point having the n parameters, the method comprising the following steps: defining a first vector from the given data point to any point on a surface defined by n points of the n+1 known data points, determining the component of the first vector along the normal to the surface defined by the n points, and defining a second vector from the n+1 point to the surface defined by the n points; calculating the dot product of the component of the first vector along the normal and the second vector, after the step of defining the first and second vectors; and determining whether the calculated dot product is positive or negative after the calculating step.

One embodiment of the invention provides a method of determining if a given data point having at least three parameters falls within a population defined by known data points, each known data point having the three parameters, the method comprising the following steps: calculating the respective standard deviations for each of the parameters for all of the known data points; determining which of the known data points is closest to the given data point; and after the calculating step and the determining step, defining the given data point as being within the population if, for each of the parameters, the given data point is within a predetermined distance from the determined closest known data point, the predetermined distance for each of the parameters being a function of the calculated standard deviation for the parameter.

One embodiment of the invention provides a method of determining if a given data point representing sensed color and having three parameters should be considered to be "acceptable", the method comprising the following steps: (a) providing a database containing a first population of at least four data points that each represent a color known to have been classified as "acceptable", and containing a second population of data points that each represent a color known not to have been classified as "acceptable"; (b) determining, after step (a), which of the data points of the second population is closest to the given data point; (c) defining, after step (b), an ellipsoidal neighborhood around the closest data point of the second population; (d) determining, after step (c) if the given data point is in the ellipsoidal neighborhood defined in step (c), and if so, indicating that the given data point can not be automatically considered to be "acceptable", and if not, proceeding to step (e); (e) determining which of the data points of the first population is closest to the given data point; (f) defining, after step (e), an ellipsoidal neighborhood around the closest data point of the first population; (g) determining, after step (f) if the given data point is in the ellipsoidal neighborhood defined in step (f), and if so, indicating that the given data point can automatically be considered "acceptable", and if not, proceeding to step (h); and (h) determining if the given data point falls within any of a plurality of tetrahedrons, each of the tetrahedrons having four vertices, each of the vertices of each tetrahedron being defined by one of the data points of the first population, and if so, indicating that the given data point can be automatically considered "acceptable", and if not, indicating that the given data point can not be automatically considered to be "acceptable".

One embodiment of the invention provides an apparatus for determining if a given data point having at least three parameters falls within a population defined by at least four known data points, each data point having the three parameters, the apparatus comprising: structure for defining a tetrahedron having four vertices, each of the vertices of the tetrahedron being defined by one of the known data points; and structure for determining if the given data point lies within the tetrahedron.

One embodiment of the invention provides an apparatus for determining if a given data point having at least three parameters falls within a population defined by more than four known data points, each data point having the three parameters, the apparatus comprising: structure for defining a plurality of tetrahedrons, each of the tetrahedrons having four vertices, each of the vertices of each tetrahedron being defined by one of the known points; and structure for determining if the given data point falls within any of the plurality of tetrahedrons.

One embodiment of the invention provides an apparatus for determining if a given data point, having a predetermined number n of parameters, falls within a population defined by at least n+1 known data points, each known data point having the n parameters, n being at least 2, the apparatus comprising: structure for defining a triangle having three vertices, each of the vertices of the triangle being defined by two of the parameters of respective ones of the known points, the same two parameters being used to define each of the vertices; and structure for determining if the given data point lies within the triangle with regard to the same two parameters.

One embodiment of the invention provides an apparatus for determining if a given data point, having a predetermined number n of parameters, falls within a population defined by at least n+1 known data points, each known data point having the n parameters, the apparatus comprising: structure for defining a first vector from the given data point to a point on a surface defined by n points of the n+1 known points; structure for determining the component of the first vector along the normal to the surface defined by the n points; structure for defining a second vector from the n+1 point to the surface defined by the n points; structure for calculating the dot product of the component of the first vector along the normal and the second vector; and structure for determining whether the calculated dot product is positive or negative.

One embodiment of the invention provides an apparatus for determining if a given data point having at least three parameters falls within a population defined by at least four known data points, each known data point having the three parameters, the apparatus comprising: structure for determining which of the known data points is closest to the given data point; structure for defining an ellipsoidal neighborhood around the closest data point; and structure for determining if the given data point is in the ellipsoidal neighborhood.

One embodiment of the invention provides an apparatus for determining if a given data point representing sensed color and having three parameters should be considered to be "acceptable", the apparatus comprising: structure defining a database containing a first population of at least four data points that each represent a color known to have been classified as "acceptable", and containing a second population of data points that each represent a color known not to have been classified as "acceptable"; structure for determining which of the data points of the second population is closest to the given data point; structure for defining an ellipsoidal neighborhood around the closest data point of the second population; structure for determining if the given data point is in the ellipsoidal neighborhood around the closest data point of the second population; structure for indicating that the given data point can not be automatically considered to be "acceptable" if the given data point is in the ellipsoidal neighborhood around the closest data point of the second population; structure for determining which of the data points of the first population is closest to the given data point; structure for defining an ellipsoidal neighborhood around the closest data point of the first population; structure for determining if the given data point is in the ellipsoidal neighborhood defined around the closest data point of the first population; structure for indicating that the given data point can automatically be considered "acceptable" if the given data point is in the ellipsoidal neighborhood defined around the closest data point of the first population; structure for determining if the given data point falls within any of a plurality of tetrahedrons, each of the tetrahedrons having four vertices, each of the vertices of each tetrahedron being defined by one of the data points of the first population; structure for indicating that the given data point can be automatically considered "acceptable" if the given data point falls within any of the plurality of tetrahedrons, wherein each of the tetrahedrons has four vertices, and wherein each of the vertices of each tetrahedron is defined by one of the data points of the first population; and structure for indicating that the given data point can not be automatically considered to be "acceptable" if the given data point does not fall within any of the plurality of tetrahedrons, wherein each of the tetrahedrons has four vertices, and wherein each of the vertices of each tetrahedron is defined by one of the points of the first population.

The invention provides a method for classifying data in any n-dimensional space. The invention has application to many classification problems including color analysis. The invention can be used with any number of classifications, and any number of parameters. The invention can be used to solve classification problems where populations are not normally distributed, such as the problem of FIG. 11.13 on p. 530 of *Applied Multivariate Statistical Analysis*. With regard to color, the method of the invention is advantageous in that only a few data points that have previously classified as "acceptable" are needed. The method is conservative and minimizes the probability of accepting a "marginal" or "rejected" color. Further, with regard to color, the method is a true three dimensional approach and does not suffer any of the problems that can occur when trying to fit two-dimensional ellipses around data points in three dimensional space. The method is also superior to any method that attempts to fit a large three dimensional ellipsoid around data points classified as "acceptable" since those large ellipsoids by their symmetrical nature inherently include substantial regions where there are no data points, resulting in a much higher risk of classifying a given data point as "acceptable" when it should be classified as "rejected" or "marginal".

Other features and advantages of the invention will become apparent to those of ordinary skill in the art upon review of the following detailed description, claims, and drawings.

BRIEF DESCRIPTION OF THE VIEWS OF THE DRAWINGS

FIG. 4 illustrates determining if a given data point, defined by three color parameters a*, b*, and L*, is in a neighborhood surrounding the closest known data point which was previously classified as "acceptable".

FIG. 5 illustrates determining if a given data point, defined by three color parameters a*, b*, and L*, is in a tetrahedron defined by joining with straight lines four known data points which were previously classified as "acceptable".

Figure 1:
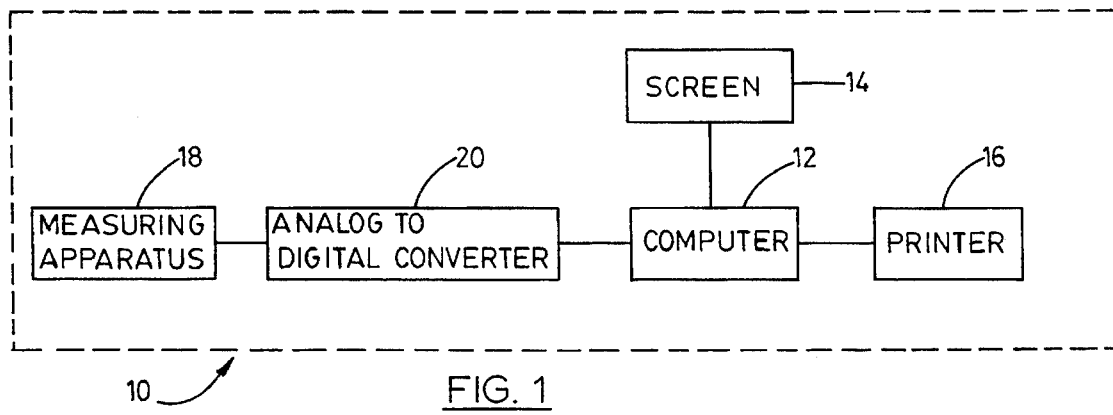
FIG. 1 is a block diagram of an apparatus in accordance with the present invention.
Figure 2A:
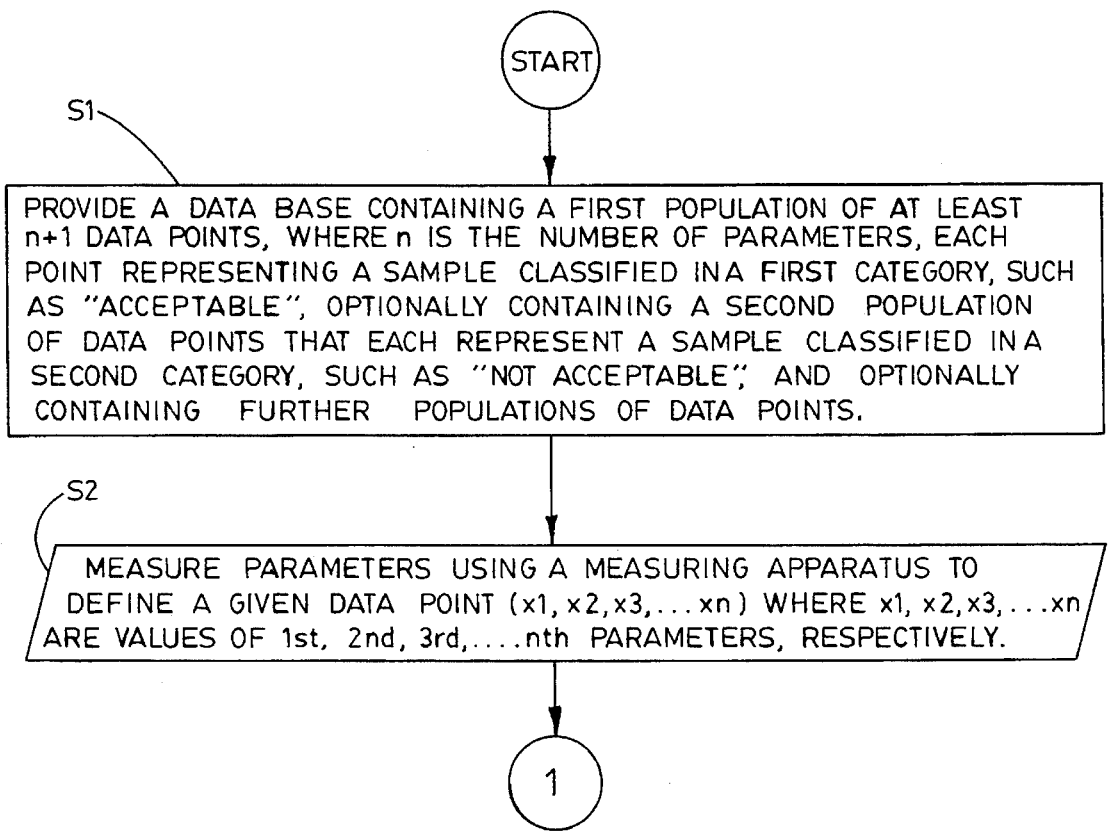
FIGS. 2a–2f show a flowchart illustrating a method in accordance with the invention and carried out by the apparatus of FIG. 1.
Figure 2B:
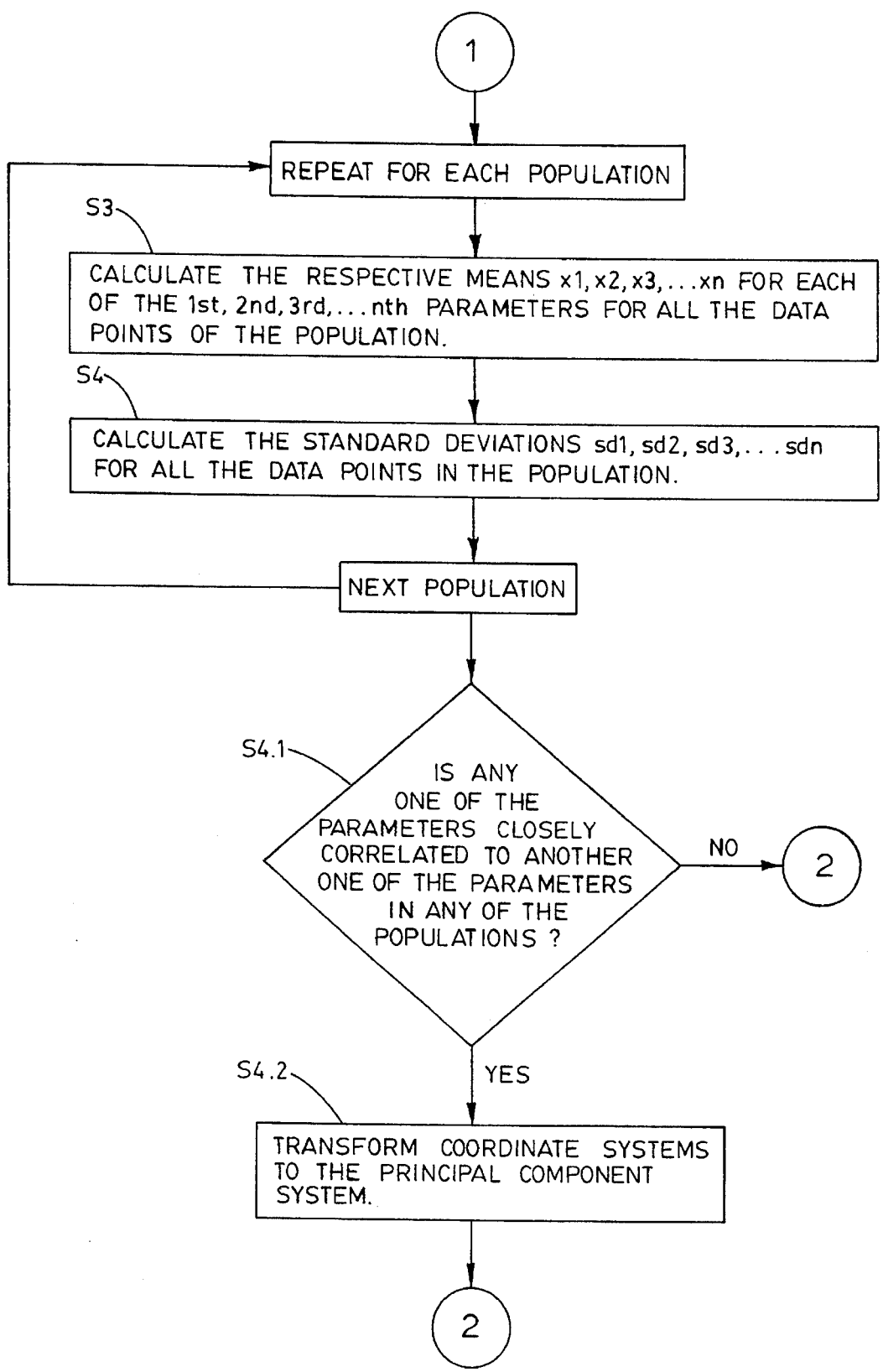
Figure 2C:
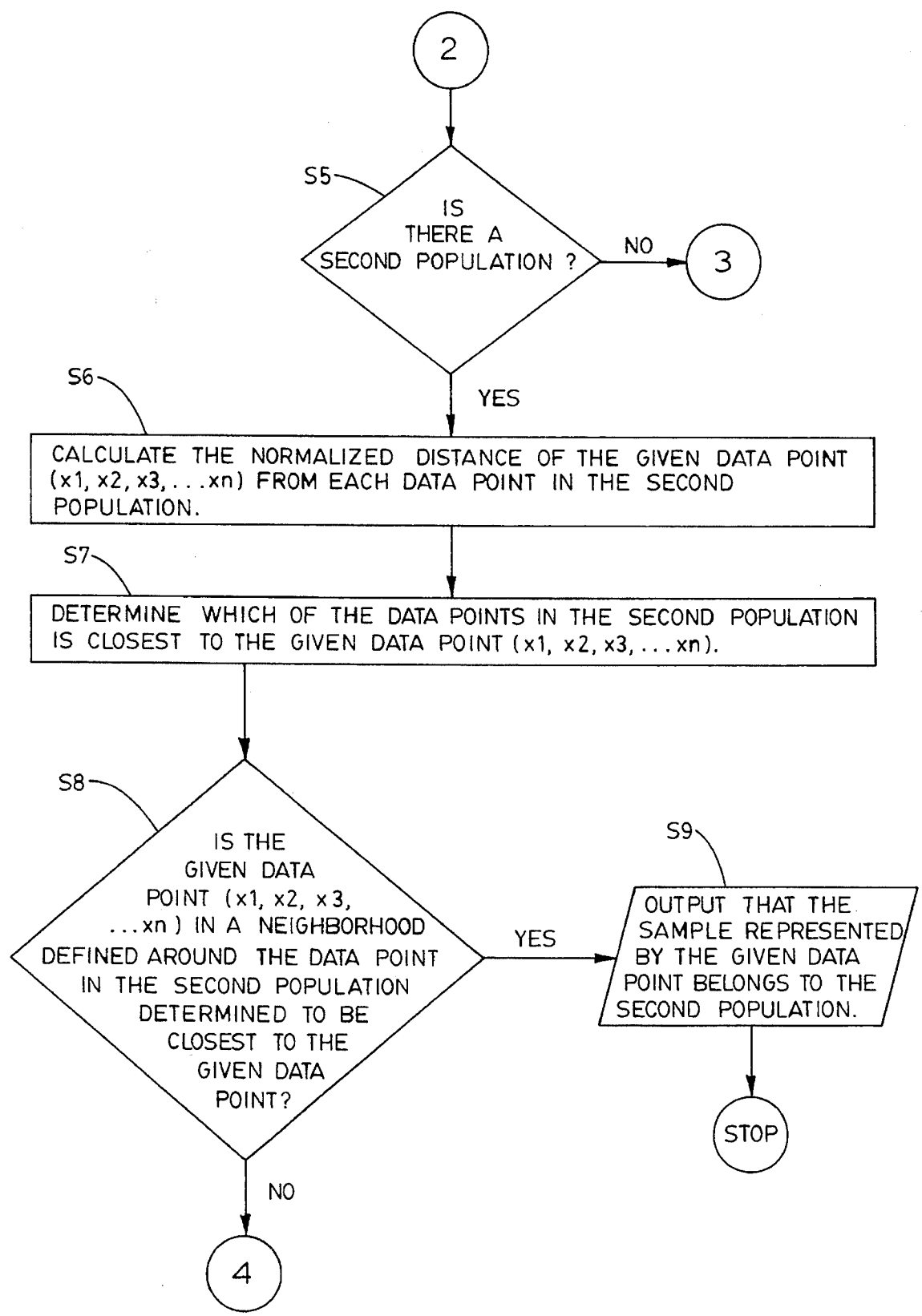
Figure 2D:
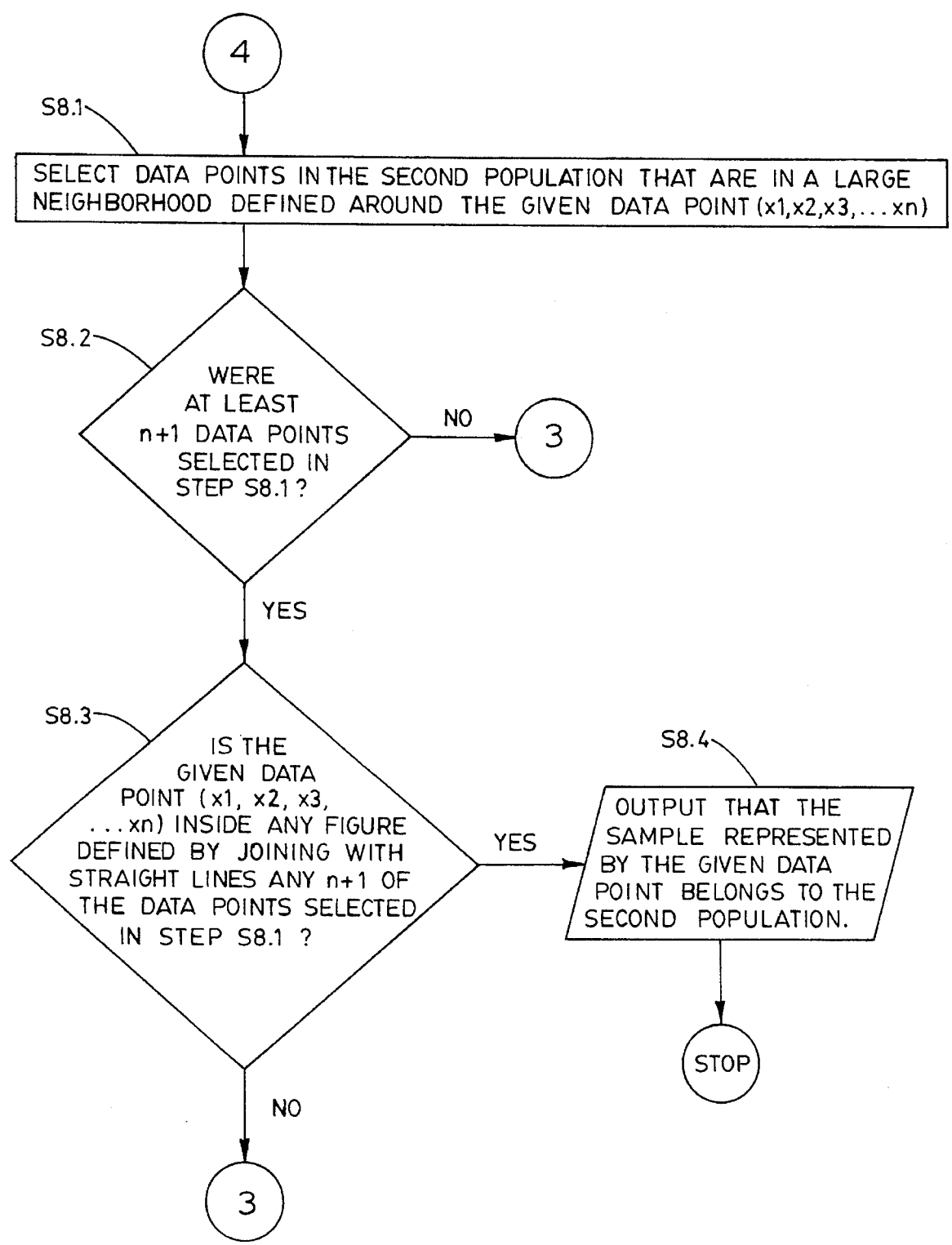
Figure 2E:
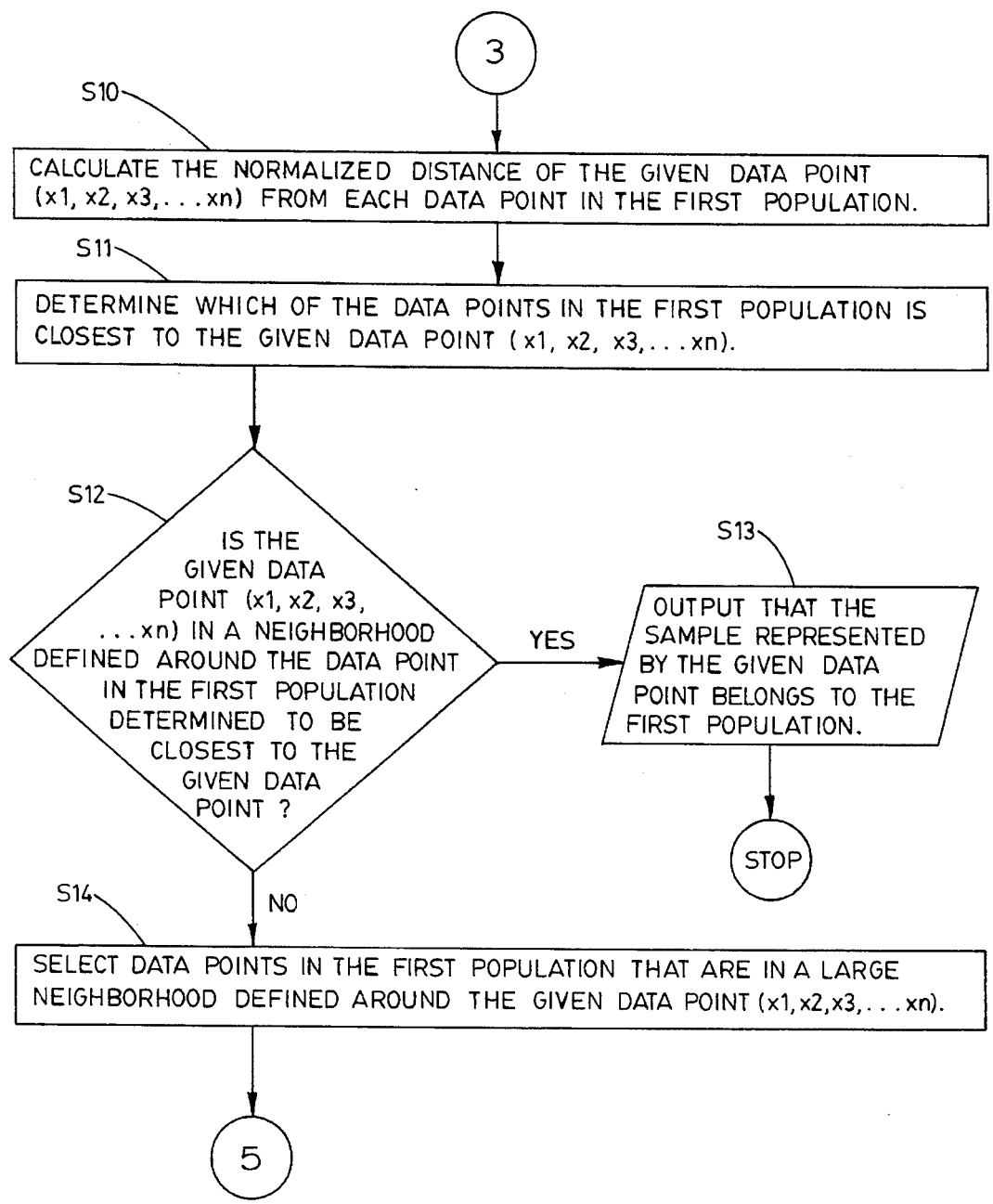
Figure 2F:
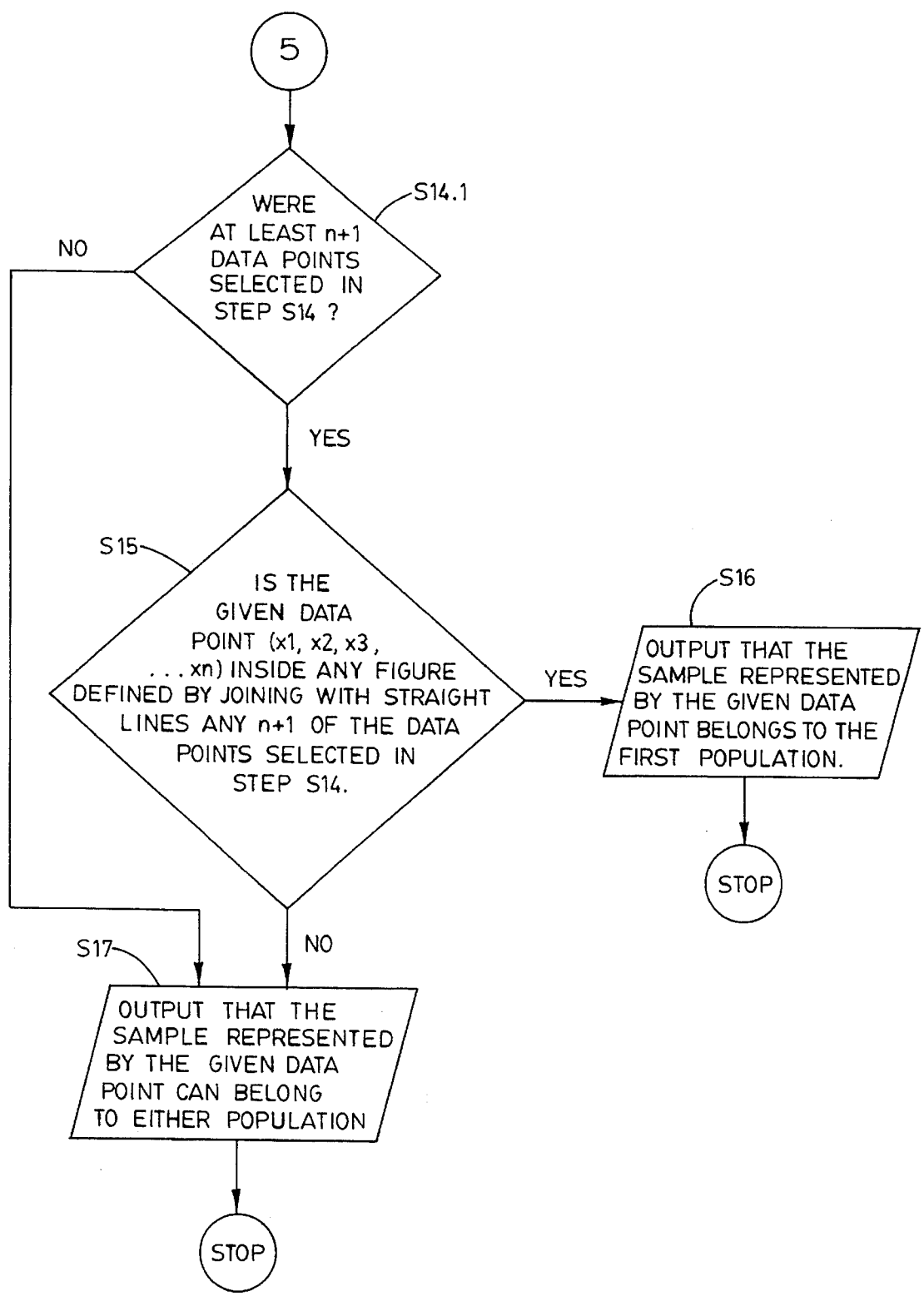

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting. It is to be understood that in equations used in the following description of one embodiment of the invention, the symbol "*" is used to denote regular multiplication (other than when used in conjunction with the color convention a*, b*, L*), "." is used to denote a vector dot product, and "/" is used to denote regular division. Further, in equations used in the following description of one embodiment of the invention, "i", "j", "k" and "l" are used to represent unit vectors along axes in an orthogonal coordinate system.

DETAILED DESCRIPTION OF THE PREFERRED EMBODIMENT OF THE INVENTION

Although the invention will be disclosed herein using a color analysis application, it should be kept in mind that the invention has application in all fields where it is desired to classify new information based on prior experience. The invention can be used, for example, to determine which of a set of potential university students that each have qualifications defined by a data point having a high school grade parameter, a standardized test score parameter, a parameter representing the student's rank in the high school, and a parameter representing the high school's rank among high schools should be classified as "acceptable", "not acceptable", or "marginal", with regard to appropriateness for admission into the university, based on the university's previous experience.

The invention can be used to classify insurance companies as 'solvent' or "distressed" using the following parameters: total assets, cost of stocks and bond, loss expenses, surplus, and amount of premiums.

The invention can be used to classify home-owners as being "riding-mower owners" or "not riding-mower owners" based on the parameters of lot size and income.

The invention can be used to classify credit applicants as being a "good risk" or a "bad risk" based on the following parameters: income, age, number of credit cards, and family size.

The invention can be used to classify consumers as being "likely to purchase new products" or "reluctant to purchase new products" based on the following parameters: education, family size, income, and amount of previous brand switching.

The invention can also be used to solve the problem set forth in the Background of the Invention relating to the field of color recognition (color analysis).

Classification problems are set forth in *Applied Multivariate Statistical Analysis*. Other applications will become apparent to those skilled in the art.

As will become apparent, the invention can be used with any number of parameters, and any number of classifications. The classifications need not be related to acceptability. Unlike methods disclosed in *Applied Multivariate Statistical Analysis*, the invention can be used with populations that are not normally distributed.

Shown in FIG. 1 is a system 10 for determining if a given data point, having a predetermined number n of parameters, falls within a population defined by at least n+1 known data points, each known data point having the n parameters.

The system 10 comprises a microprocessor. In the preferred embodiment, the system 10 comprises a microprocessor driven computer 12. While various types of computers can be used, in the illustrated embodiment an IBM compatible personal computer is used. The computer 12 is a typical computer including memory (not shown), a screen 14, and optionally including a printer 16.

The system 10 further comprises means for defining the given data point by measuring the n parameters for the given data point. When the invention is used in the field of color analysis, there are three parameters, and the means for measuring the three parameters for the given data point comprises means for measuring three parameters relating to color. While various other color systems exist, for purposes of example, it will be assumed herein that the three parameters consist of a red/green parameter (a*), a yellow/blue parameter (b*), and a lightness parameter (L*). In the color analysis application, the means for measuring the parameters comprises a measuring apparatus 18 selected from the group consisting of a colorimeter, a spectrophotometer, and an abridged spectrophotometer.

The system 10 further includes an analog to digital converter 20 that connects, via communications cables (not shown), the measuring apparatus 18 to the computer 12.

The computer 12 is programmed to carry out the method illustrated in FIGS. 2a–2f and in accordance with the invention. While various computer programming languages can be employed, the illustrated embodiment of the invention was programmed using a high level programming language. More particularly, the illustrated embodiment of the invention was programmed using the BASIC programming language.

The method comprises the step, illustrated as S1, of providing a database containing a first population of at least n+1 data points, each representing color samples for example, which data points are known to have each been classified in a first category ("acceptable", for example), and the database optionally containing a second population of data points having the same set of parameters as the points in the first population, which data points in the second population are known to have been classified in a second category ("not acceptable", for example). Data points in the database would reflect classification based on actual past experience. With regard to the color analysis application, the classifications of data points in the database would reflect prior visual inspections by a human color expert. The color expert, based on a visual inspections, would have classified a color sample as "acceptable" (first population), or would have classified the color sample as "not acceptable" (second population). The parameters of this color sample would then have been entered into the database in a location associated with "acceptable" data points, if the color sample was determined to be "acceptable", or in another location if the color sample was not determined to be "acceptable". The database could be defined on one or more floppy discs, on a hard drive included in the computer 12, or in memory in the computer 12.

The method further comprises, after step S1, the step, illustrated as step S2, of measuring n parameters using a measuring apparatus, to define a given data point $(x_1, x_2, x_3, \ldots x_n)$. Using the color analysis application, in the step S2, the measuring apparatus 18 is used to measure the three parameters a*, b*, and L* for a color sample to define a given data point $(x_1, x_2, x_3)$ where $x_1$ represents the value of the a* parameter measured by the measuring apparatus 18, $x_2$ represents the value of the b* parameter measured by the measuring apparatus 18, and $x_3$ represents the value of the L* parameter measured by the measuring apparatus 18.

The method further comprises, after step S2, steps S3 and S4, which will be described below, and which are repeated for each population. Using the color analysis application, steps S2 and S3 will first be performed for the data points in the "acceptable" classification, and will then be performed for the "not acceptable" classification.

In step S3, the respective means for each of the parameters for all the data points in the population are calculated. Using the color analysis application, in step S3, the respective means are calculated for each of the parameters a*, b*, and L* for all the data points in the classification. Also, using the color analysis application, in FIG. 2a–2f, the mean calculated for the a* parameter for all the data points in the population is denoted as X1, the mean calculated for the b* parameter for all the data points in the population is denoted as $X_2$, and the mean calculated for the L* parameter for all the data points in the population is denoted as $X_3$.

The method further comprises, after step S3, the step, illustrated as step S4, of using the respective means $X_1, X_2, X_3, \ldots X_n$ calculated in step S3 for calculating respective standard deviations $sd_1, sd_2, sd_3, \ldots sd_n$ for each of the parameters for all the data points in the population.

It should be noted that when one population surrounds another population, such as in the color analysis application where rejected data points surround accepted points, standard deviations need only be calculated for the inner population. When one population surrounds another population, the standard deviations calculated for the inner population are always used when standard deviations are called for in a formula in the following steps. If one population does not surround another population, the standard deviations for the relevant population are used when standard deviations are called for in a formula in the following steps. For example, in step S6 described below, the normalized distance from the given data point $(x_1, x_2, x_3, \ldots x_n)$ to a point $(r_1, r_2, r_3, \ldots r_n)$ in the second population is calculated. If one population does not surround another, the standard deviations $sd_1, sd_2, sd_3, \ldots sd_n$ referred to in step S6 are the standard deviations for the second population. If one population surrounds another, such as in the color analysis application, the standard deviations $sd_1, sd_2, sd_3, \ldots sd_n$ referred to in step S6 are the standard deviations for the inner population (the first population in the color analysis application).

In the color analysis application, the standard deviation calculated for the first parameter (a*) for all the data points in the population is denoted as $sd_1$, the standard deviation calculated for the second parameter (b*) for all the data points in the population is denoted as $sd_2$, and the standard deviation calculated for the third parameter (L*) for all the data points in the population is denoted as $sd_3$.

The method further comprises, after the loop comprising steps S3 and S4, the step, illustrated as step S4.1, of determining if any of the parameters (a*, b*, L* in the color analysis application) is closely correlated to another one of the parameters (a*, b*, L* in the color analysis application). This determination is made, in the preferred embodiment, by performing the following steps for each population. First, sample covariances are calculated using the following formula:

$$S_{ik} = (1/p) \left( \Sigma_j (x_{ij} - X_i)(x_{kj} - X_k) \begin{array}{l} i = 1,2,3, \ldots n; \\ j = 1,2,3, \ldots p; \\ k = 1,2,3, \ldots n \end{array} \right)$$

where n is the number of parameters, where p is the number of points in the population, where the first subscript of x and the subscript of X represents the number of a parameter, where the second subscript of x represents the number of a data point, and where X represents the mean of the parameter designated by the subscript thereof for all the data points in the population. Using the color analysis application, assuming that there are twenty data points in one of the populations, the sample covariance of the a* parameter with respect to the b* parameter will be:

$$S_{a*b*} = (1/20)(\Sigma_j (x_{a*j} - X_{a*})(x_{b*j} - X_{b*}))\ j=1, 2, 3, \ldots 20)$$

Once sample covariances are calculated for each possible combination of parameters for the population, sample correlation coefficients $R_{ik}$ are calculated as follow:

$$R_{ik} = S_{ik}/(S_{ii}*S_{kk})^{0.5}$$

Using the color analysis application, the sample correlation coefficient of the a* parameter with respect to the b* parameter will be:

$$R_{a*b*} = S_{a*b*}/(S_{a*a*}*S_{b*b*})^{0.5}$$

If the absolute value of any of the calculated covariances for any of the populations is greater than a predetermined value, 0.25 in the preferred embodiment of the invention, then the determination that is made in step S4.1 is that one of the parameters is closely correlated to another one of the parameters.

The method further comprises, after step S4.1 if it is determined in step S4.1 that one of the parameters is closely correlated to another one of the parameters, the step, illustrated as step S4.2, of transforming coordinate systems to the principal component system. This transformation advantageously avoids the necessity of the use of large matrices and of tensors in the steps that follow. Each data point in each population and the given data point are transformed, in the preferred embodiment, using eigenvalue-eigenvector pairs. Methods of calculating eigenvalues and eigenvectors are well known in the art and are discussed in references relating to numerical techniques, such as:

Conte, S. D., and Carl de Boor, *Elementary Numerical Analysis*, McGraw-Hill, New York, Second Edition, 1972; and Morrison, D. F., *Multivariate Statistical Methods*, McGraw-Hill, New York, Second Edition, 1976.

Eigenvalue-eigenvector pairs $(\beta_1, e_1), (\beta_2, e_2), (\beta_3, e_3), \ldots (\beta_n, e_n)$ are calculated where $\beta_1 \geq \beta_2 \geq \beta_3 \geq \ldots \geq \beta_n \geq 0$, and where n is the number of parameters. The data points are transformed to the principal component system using the following equation:

$$Y_i = e_{1i} x_1 + e_{2i} x_2 + e_{3i} x_3 + \ldots + e_{ni} x_n\ i=1, 2, 3, \ldots n$$

where n is the number of parameters, where the subscript of x and of Y is the number of a parameter, where $(x_1, x_2, x_3, \ldots x)$ is a data point to be transformed, where $(x_1, x_2, x_3, \ldots x_n)$ is the transformed data point, and where $(Y_1, Y_2, Y_3, \ldots Y_n)$ is an eigenvector having components $(e_{1i}, e_{2i}, e_{3i}, \ldots e_{ni})$. Using the color analysis application, a data point $(x_1, x_2, x_3)$, where $x_1$ represents the value of the a* parameter, where $x_2$ represents the value of the b* parameter, and where $x_3$ represents the value of the L* parameter, is transformed to a data point $(Y_1, Y_2, Y_3)$ in the principal coordinate system, where $Y_1$ represents the value of the a* parameter, where $Y_2$ represents the value of the b* parameter, and where $Y_3$ represents the value of the L* parameter, as follows:

$$Y_1 = e_{11} x_1 + e_{21} x_2 + e_{31} x_3$$

$$Y_2 = e_{12} x_1 + e_{22} x_2 + e_{32} x_3$$

$$Y_3 = e_{13} x_1 + e_{23} x_2 + e_{33} x_3$$

Respective standard deviations $sdY_1, sdY_2, sdY_3, \ldots sdY_n$ of the transformed variables $Y_1, Y_2, Y_3, \ldots Y_n$ are then calculated by taking the respective square roots of the eigenvalues $\beta_1, \beta_2, \beta_3, \ldots \beta_n$. After a data point $(x_1, x_2, x_3, \ldots x_n)$ has been transformed to a point $(Y_1, Y_2, Y_3, \ldots Y_n)$ all of the following steps are performed using the transformed data point $(Y_1, Y_2, Y_3, \ldots Y_n)$ as if it were a data point $(x_1, x_2, x_3, \ldots x_n)$. In other words, if there has been a transformation in step 4.2 to the principal coordinate system for all the data points in each population and for the given data point, in all formulas that involve a data point $(x_1, x_2, x_3, \ldots x_n)$ in subsequent steps (described below), the corresponding transformed data point $(Y_1, Y_2, Y_3, \ldots Y_n)$ is to be used in place of the data point $(x_1, x_2, x_3, \ldots x_n)$. Similarly, if there has been a transformation in step 4.2 to the principal coordinate system for all the data points in each population and for the given data point, in all formulas that involve standard deviations $sd_1, sd_2, sd_3, \ldots sd_n$ in subsequent steps (described below), the standard deviations $sdY_1, sdY_2, sdY_3, \ldots sdY_n$ are to be used in place of the standard deviations $sd_1, sd_2, sd_3, \ldots sd_n$.

The method further comprises, after step S4.1 if it is determined in step S4.1 that none of the parameters are closely correlated to one another, or after step S4.2 if it is determined in step S4.1 that one of the parameters is closely correlated to another parameter, the step, illustrated as step S5, of determining if there is a second population.

If, in step S5, it is determined that there are no points in the second population, a Jump is made to step S10 described below.

The method further comprises, after step S5 if it is determined in step S5 that there are data points in the second population, the step, illustrated as step S6, of calculating the normalized distance of the given data point $(x_1, x_2, x_3, \ldots x_n)$ from each data point in the second population ("not acceptable" data points in the color analysis application). The distance is normalized using the calculated standard deviations $sd_1, sd_2, sd_3, \ldots sd_n$. Using the color analysis application, assuming that the a*, b*, and L* values for one of the data points in the second population are $r_1, r_2$, and $r_3$ respectively, the normalized distance d from the given data point $(x_1, x_2, x_3)$ to the data point $(r_1, r_2, r_3)$ in the second population is calculated using the following formula:

$$d = ((x_1 - r_1)^2 / sd_1^2 + (x_2 - r_2)^2 / sd_2^2 + (x_3 - r_3)^2 / sd_3^{12})^{0.5}$$

In an application where there are other than three parameters, the normalized difference from a given data point $(x_1, x_2, x_3, \ldots x_n)$ to a point $(r_1, r_2, r_3, \ldots r_n)$ in the second population is calculated using the formula:

$$d = ((x_1 - r_1)^2 / sd_1^2 + (x_2 - r_2)^2 / sd_2^2 + (x_3 - r_3)^2 / sd_3^2 + \ldots$$

$$(x_n - r_n)^2 / sd_n^2)^{0.5}$$

The method further comprises, after step S6, the step, illustrated as step S7, of determining which of the data points of the second population is closest to the given data point $(x_1, x_2, x_3, \ldots x_n)$. This is done by determining which data point in the second population is associated with the smallest distance d calculated in step S6.

The method further comprises, after step S7, the step, illustrated as step S8, of determining if the given data point $(x_1, x_2, x_3, \ldots x_n)$ is in a neighborhood surrounding the data point determined in step S7 to be closest to the given data point $(x_1, x_2, x_3, \ldots x_n)$. Using the color analysis application, assuming that the a*, b*, and L* values for the data point determined in step S7 to be the data point in the second population that is closest to the given data point $(x_1, x_2, x_3)$ are $nr_1$, $nr_2$, and $nr_3$, respectively, then the given data point $(x_1, x_2, x_3)$ is in an ellipsoidal neighborhood surrounding the closest data point $(nr_1, nr_2, nr_3)$ if a distance dist is less than or equal to 1, where dist is defined as:

$$dist=((x_1-nr_1)^2/(c*sd_1)^2+(x_2-nr_2)^2/(c*sd_2)^2+$$
$$(X_3-nr_3))^2/(c*sd_3)^2)^{0.5}$$

The principal axes of this ellipsoidal neighborhood are defined to be $c*sd_1$, $c*sd_2$, and $c*sd_3$ in the a* b* and L* directions, respectively, where the preferred value of c is 0.3 in the color analysis application. The principal axes of the ellipsoidal neighborhood are advantageously chosen to be functions of the standard deviations of the respective parameters for all the data points of the first population to take into the account the fact that a greater amount of deviation may be acceptable for one parameter than for another parameter. In the color analysis application, the constant c used to multiply sdl, $sd_2$, and $sd_3$ was selected to be 0.3 for the following reason. It is generally accepted that the human eye cannot distinguish the difference between a first color and a second color if the square root of the sum of the squares of the differences in respective a*, b*, and L* values of the first color and second color is less than 0.4 ($\Delta E<0.4$ where $\Delta E=((\Delta a*)^2+(\Delta b*)^2+(\Delta L*)^2)^{0.5}$). The inventors of the present invention have determined that using the value 0.3 for the constant c results in a $\Delta E$ of less than 0.4 for almost all colors. The value of c can be different from 0.3 as long this results in $\Delta E$ being close to 0.4 for all colors. In an application where there are other than three parameters, a given data point $(x_1, x_2, x_3, \ldots x_n)$ is in a neighborhood around the closest data point $(nr_1, nr_2, nr_3, \ldots nr_n)$ in the second population if a distance dist is less than or equal to 1, where dist is defined as:

$$dist=((x_1-nr_1)^2/(c*sd_1)^2+(x_2-nr_2)^2/(c*sd_2)^2+$$
$$(x_3-nr_3)^2/(c*sd_3)^2+\ldots(x_n-nr_2)^2/(c*sd_n)^2)^{0.5}$$

For applications other than color analysis, a general method of choosing the constant c is used in the preferred embodiment of the invention as follows. First, a value of c is chosen arbitrarily. Second, the formula $$dist=((x_1-nr_1)^2/(c*sd_1)^2+(x_2-nr_2)^2/(c*sd_2)^2+$$
$$(x_3-nr_3)^2/(c*sd_3)^2+\ldots(x_n-nr_n)^2/(c*sd_n)^2)^{0.5}$$

is used repeatedly to calculate how many data points in each of the first and second populations are in a neighborhood around a data point in the first population. The second step is repeated by defining neighborhoods around each data point in the first population. Third, the calculated information is used to calculate the probability of misclassifying a data point in the second population as being in the first population. The first through the third steps are repeated for different values of c until a value of c is found that provides an acceptable probability of misclassification.

Steps S6, S7, and S8 determine whether or not the given data point is in close proximity to one of the data points in the second population.

If, in step S8, the value of dist is less than or equal to 1, then, at step S9, the method provides an indication at the screen 14 and/or the printer 16 that is appropriate given that the data point most likely belongs to the second population. In the color analysis application, where the second population contains data points that are "not acceptable," the method provides an indication at the screen 14 and/or the printer 16 that the color represented by the given data point $(x_1, x_2, x_3)$ requires visual inspection.

The method further comprises, after step S8 if the given data point $(x_1, x_2, x_3, \ldots x_n)$ is determined to not be in the neighborhood defined in step S8, the step, illustrated as step S8.1 of selecting the data points in the second population that are in a neighborhood defined around the given data point $(x_1, x_2, x_3, \ldots x_n)$. Using the color analysis application, assuming that the a*, b*, and L* values for a data point in the first population are $a_1$, $a_2$, and $a_3$, respectively, then the data point $(a_1, a_2, a_3)$ is in a large ellipsoidal neighborhood surrounding the given data point $(x_1, x_2, x_3)$ if a distance dist4 is less than or equal to 1, where $sd_1$, $sd_2$, and $sd_3$ are the standard deviations calculated in step S4, and where dist4 is defined as:

$$dist4=((x_1-a_1)^2/(c4*sd_1)^2)+(x_2-a_2)^2/(c4*sd_2)^2+$$
$$(x_3-a_3)^2/(C4*sd_3)^2)^{0.5}$$

The principal axes of this ellipsoidal neighborhood are defined to be $c4*sd_1$, $c4,sd_2$, and $c4*sd$ in the a* b* and L* directions, respectively, where the preferred value of c4 in the color analysis application is 1. As was the case in step S8, the principal axes of the ellipsoidal neighborhood are advantageously chosen to be functions of the standard deviations of the respective parameters for all the data points of the first population to take into the account the fact that a greater amount of deviation may be acceptable for one parameter than for another parameter. The value 1 for the constant c4 used to multiply $sd_1$, $sd_2$, and $sd_3$ was selected using reasoning similar to the reasoning used to select the value 0.3 for the constant c in step S8, but so as to define an ellipsoid that is relatively large in area. In an application involving data points representing something other than color, a data point $(a_1, a_2, a_3, \ldots a_n)$ is in a neighborhood around the given data point $(x_1, x_2, x_3, \ldots x_n)$ in the second population if a distance dist4 is less than or equal to 1, where dist4 is defined as:

$$dist4=((x_1-a_1)^2/(c4*sd_1)^2+(x_2-a_2)^2/(c4*sd_2)^2+$$
$$(x_3-a_3)^2/(c4*sd_3)^2+\ldots(x_n-a_n)^2/(c4*sd_n)^2)^{0.5}$$

For applications other than color analysis, the constant c4 should be chosen such that the defined neighborhood defines an area of acceptable deviance. More particularly, the general method of choosing the constant c in step S8 for applications other than color analysis is used to select a value for the constant c4. Step S8.1 limits the size of the n+1 surfaced figures defined in step S8.3 described below.

The method further comprises, after step S8.1, the step illustrated as step S8.2 of determining whether or not at least n+1 data points were selected in step S8.1. If at least n+1 data points were not selected in step S8.1, a jump is made to step S10 described below.

The method further comprises, after step S8.2 if it is determined in step S8.2 that at least n+1 data points were selected in step S8.1, the step, illustrated as step S8.3, of determining whether or not the given data point lies inside any n+1 surfaced figure formed by Joining with straight lines any n+1 of the data points selected in step S8.1, where n is the number of parameters. In the color analysis application, the determination made in step S8.3 is whether or not the given data point lies inside any one of the tetrahedrons defined by all possible combinations of four of the data points selected in step S8.1. In an application involving data points representing something other than color, where there are other than three parameters, the determination made in step S8.3 is whether or not the given data point $(x_1, x_2, x_3, \ldots x_n)$ lies inside any one of the n+1 surfaced figures defined by all possible combinations of n+1 of the data points selected in step S8.1.

The method of step S8.3 of determining whether or not the given data point lies inside a n+1 surfaced figure is identical to the method of step S15, described below in conjunction with FIG. 3.

If, in step S8.3, it is determined that the given data point lies inside one of the n+1 surfaced figures defined by all possible combinations of n+1 of the data points selected in step S8.1, then, at step S8.4, the method provides an indication at the screen 14 and/or the printer 16 that is appropriate given that the data point most likely belongs to the second population. In the color analysis application, where the second population contains data points that are "not acceptable," the method provides an indication at the screen 14 and/or the printer 16 that visual inspection of the color represented by the given data point $(x_1, x_2, x_3)$ is necessary.

Optionally, the method can be used with more than two classifications. In the color analysis application, the database defined in step S1 can include data points that each represent the a*, b*, and L* values of colors classified as "marginal", and after step S8, if the given data point was not determined to be in a neighborhood defined around the data point in the second population determined to be closest to the given data point, the steps shown in FIG. 2c and FIG. 2d can be repeated as if these "marginal" data points defined the second population.

The method further comprises, after step S8.3 if it is determined in step S8.3 that the given data point is not inside any figure defined by joining with straight lines any n+1 of the data points selected in step S8.1, or after step S8.2 if it is determined in step S8.2 that at least n+1 data points were not selected in step S8.1, the step, illustrated as step S10, of calculating the normalized distance of the given data point $(x_1, x_2, x_3, x_n)$ from each data point in the first population. The distance is normalized using the standard deviations $sd_1$, $sd_2$, $sd_3$, ... $sd_n$ calculated in step S4. In the color analysis application, assuming that the a*, b*, and L* values for one of the data points in the first population are $a_1$, $a_2$, and $a_3$, respectively, the normalized distance $d_2$ from the given data point $(x_1, x_2, x_3)$ to the point $(a_1, a_2, a_3)$ in the first population is calculated using the following formula:

$$d2=((x_1-a_1)^2/sd_1^2+(x_2-a_2)^2/sd_2^2+(x_3-a_3)^2/sd_3^2)^{0.5}$$

In an application where there are other than three parameters, the normalized distance d2 from a given data point $(x_1, x_2, x_3, \ldots x_n)$ to a point $(a_1, a_2, a_3, \ldots a_n)$ in the first population is calculated using the formula:

$$d2=((x_1-a)^2/sd_1^2-(x_2-a_2)^2/sd_2^2+(x_3-a_3)^2/sd_3^2 +$$
$$(x_n-a_n)^2/sd_n^2)^{0.5}$$

The method further comprises, after step S10, the step, illustrated as step S11, of determining which of the data points of the first population is closest to the given data point $(x_1, x_2, x_3, \ldots x_n)$. This is done by determining which data point in the first population is associated with the smallest distance d2 calculated in step S10.

The method further comprises, after step S11, the step, illustrated as step S12, of determining if the given data point $(x_1, x_2, x_3, \ldots x_n)$ is in a neighborhood surrounding the data point determined in step S11 to be closest to the given data point $(x_1, x_2, x_3, \ldots x_n)$. Using the color analysis application, assuming that the a*, b*, and L* values for the data point determined in step S11 to be the data point in the first population that is closest to the given data point $(x_1, x_2, x_3)$ are $na_1$, $na_2$, and $na_3$, respectively, then the given data point $(x_1, x_2, x_3)$ is in an ellipsoidal neighborhood surrounding the closest data point $(na_1, na_2, ha_3)$ if a distance dist2 is less than or equal to 1, where $sd_1$, $sd_2$, and $sd_3$ are the standard deviations calculated in step S4, and where dist2 is defined as:

$$dist2=((x_1'na_1)^2/(c2*sd_1)^2+(x_2-na_2)^2/(c2*as_1)^2+$$
$$(x_3-na_3))^2/(c2*sd_3)^2)^{0.5}$$

The principal axes of this ellipsoidal neighborhood are defined to be $c2, sd_1$, $c2*sd_2$, and $c2*sd_3$ in the a* b* and L* directions, respectively, where the preferred value of c2 is 0.3 in the color analysis application. As was the case in step S8, the principal axes of the ellipsoidal neighborhood are advantageously chosen to be functions of the standard deviations of the respective parameters for all the data points of the first population to take into the account the fact that a greater amount of deviation may be acceptable for one parameter than for another parameter. The value 0.3 for the constant c2 used to multiply $sd_1$, $sd_2$, and $sd_3$ in the color analysis application was selected using reasoning analogous the reasoning used to select the value 0.3 for the constant c in the color analysis application in step S8. In an application involving data points where there are other than three parameters, a given data point $(x_1, x_2, x_3, \ldots x_n)$ is in a neighborhood around the closest data point $(na_1, na_2, na_3, \ldots na_n)$ in the first population if a distance dist2 is less than or equal to 1, where dist2 is defined as:

$$dist2=((x_1-na_1)^2/(c2*sd_1)^2+(x_2-na_2)^2/(c2*sd_2)^2+$$
$$(x_3-na_3)^2/(c_2*sd_3)^2+\ldots (x_n-na_n)^2/(c2*sd_n)^2)^{0.5}$$

For applications other than color analysis, the constant c2 should be chosen such that the defined neighborhood defines an area of acceptable deviance. More particularly, the general method of choosing the constant c in step S8 for applications other than color analysis is used to select a value for the constant c2.

Steps S10, S11, and S12 determine whether or not the given data point is in close proximity to a data point in the first population.

FIG. 4 provides an illustration of this for a color analysis application.

If, in step S12, the value of dist2 is less than or equal to 1, then, at step S13, the method provides an indication at the screen 14 and/or the printer 16 that is appropriate given that the data point most likely belongs to the first population. In the color analysis application, where the first population contains data points that are "acceptable," the method provides an indication at the screen 14 and/or the printer 16 that the color represented by the given data point $(x_1, x_2, x_3)$ is likely acceptable.

The method further comprises, after step S12 if the given data point $(x_1, x_2, x_3, \ldots x_n)$ is determined to not be in the neighborhood defined in step S12, the step, illustrated as step S14 of selecting the data points in the first population that are in a neighborhood defined around the given data point $(x_1, x_2, x_3, \ldots x_n)$. Using the color analysis application, assuming that the a*, b*, and L* values for a data point in the first population are $a_1$, $a_2$, and $a_3$, respectively, then the data point $(a_1, a_2,$ and $a_3)$ is in a large ellipsoidal neighborhood surrounding the given data point $(x_1, x_2, x_3)$ if a distance dist3 is less than or equal to 1, where $sd_1$, $sd_2$, and $sd_3$ are the standard deviations calculated in step S4, and where dist3 is defined as:

$$dist3=((x_1-a_1)^2/(c3*sd_1)^2+(x_2-a_2)^2/(c3*sd_2)^2+$$

$(x_3-a_3)^2/(c3*asd_3)^2)^{0.5}$

The principal axes of this ellipsoidal neighborhood are defined to be $c3*sd_1$, $c3*sd_2$, and $c3*sd_3$ in the a* b*, and L* directions, respectively, where the preferred value of c3 in the color analysis application is 1. As was the case in step S8, the principal axes of the ellipsoidal neighborhood are advantageously chosen to be functions of the standard deviations of the respective parameters for all the data points of the first population to take into the account the fact that a greater amount of deviation may be acceptable for one parameter than for another parameter. The value 1 for the constant c3 used to multiply $sd_1$, $sd_2$, and $sd_3$ was selected using reasoning similar to the reasoning used to select the value 0.3 for the constant c in step S8, but so as to define an ellipsoid that is relatively large in area. In an application involving data points representing something other than color, a data point $(a_1, a_2, a_3, \ldots a_n)$ is in a neighborhood around the given data point $(x_1, x_2, x_3, \ldots x_n)$ in the first population if a distance dist3 is less than or equal to 1, where dist3 is defined as:

$$dist3=((x_1-a_1)^2/(c3*sd_1)^2+(x_2-a_2)^2/(c3*sd_2)^2+$$

$$(x_3-a_3)^2/(c3*sd_3)^2+\ldots (x_n-a_n)^2/(c3*sd_n)^2)^{0.5}$$

For applications other than color analysis, the constant c3 should be chosen such that the defined neighborhood defines an area of acceptable deviance. More particularly, the general method of choosing the constant c in step S8 for applications other than color analysis is used to select a value for the constant c3.

The method further comprises, after step S14, the step illustrated as step S14.1 of determining whether or not at least n+1 data points were selected in step S14. If at least n+1 data points were not selected in step S14, a Jump is made to step S17 described below.

The method further comprises, after step S14.1 if it is determined in step S14.1 that at least n+1 data points were selected in step S14, the step, illustrated as step S15, of determining whether or not the given data point lies inside any n+1 surfaced figure formed by Joining with straight lines any n+1 of the data points selected in step S14, where n is the number of parameters. In the color analysis application, the determination made in step S15 is whether or not the given data point lies inside any one of the tetrahedrons defined by all possible combinations of four of the data points selected in step S14. In an application involving data points representing something other than color, where there are other than three parameters, the determination made in step S15 is whether or not the given data point $(x_1, x_2, x_3, \ldots x_n)$ lies inside any one of the n+1 surfaced figures defined by all possible combinations of n+1 of the data points selected in step S14.

FIG. 5 provides an illustration of this for a color analysis application.

When the method is used specifically with regard to color analysis, step S14 could optionally be omitted and a determination could be made in step S15 as to whether or not the given data point falls within a tetrahedron defined by any points in the first population. The reason for this is that it has been determined through experimentation that color acceptance envelopes tend to be ellipsoidal in shape. The inventors of the present invention have recognized that all ellipsoidal shapes have the property that they are convex when viewed from outside, and that if a straight line joins any two points within the convex shape, then no part of that straight line can lie outside the convex shape. Thus, since every data point in the first population lies within an acceptance envelope, any tetrahedron formed by joining four points in the first population will necessarily be entirely within the acceptance envelope, and the size of the tetrahedron does not need to be limited by performing step S14. The method is thus less restrictive than requiring an ellipsoidal acceptance envelope for the data points in the first population in order to function properly-only a convex acceptance envelope is required. Therefore, step S14 can be omitted when the data points in the first population are of a type that fall within a convex acceptance envelope.

Figure 3:
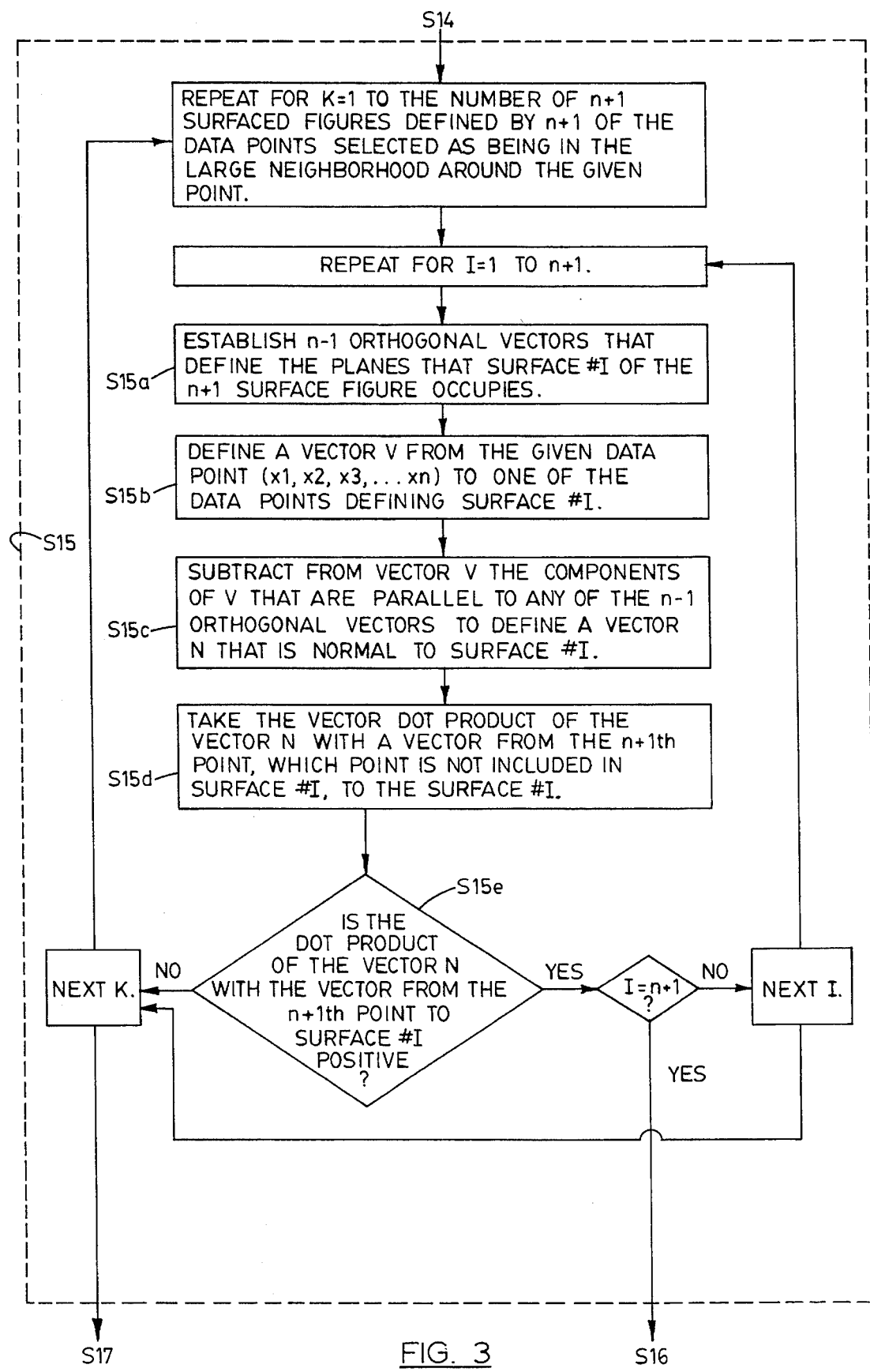
FIG. 3 is a flowchart illustrating in detail a set of steps that are repeated in one of the steps in the method illustrated in FIGS. 2a–2f.

Step S15 comprises steps shown in FIG. 3. The method of step S15 of determining whether or not the given data point lies inside a n+1 surfaced figure will now be described in detail in conjunction with FIG. 3, and assuming that there are three parameters (n=3). The n+1 surface figure will be a tetrahedron having four vertices, each vertex being defined by one of the data points selected in step S14, and the tetrahedron will have four surfaces with each surface being defined by three of the four vertices. The following steps are repeated for each surface of the tetrahedron.

In step S15a, two orthogonal vectors are established in the plane of the triangular surface. One side of the triangular surface is used to establish a first one of these vectors. The other one of these vectors is established by using another side of the triangular surface and taking its component normal to the first one of the vectors. Each orthogonal vector is normalized to define a unit orthogonal vector.

In step S15b, after step S15a, a vector V is defined from the given data point $(x_1, x_2, x_3)$ to one of the vertices of the triangular surface. (The vector can be defined from the given data point to any one of the vertices of the triangular surface).

In step S15c, after step S15b, the respective components of the vector V that are parallel to each of the unit orthogonal vectors are found by taking the respective dot products of the vector V with each of the unit orthogonal vectors. The components of the vector V that are parallel to each of orthogonal vectors established in step S15a are subtracted from the vector V to leave a vector N, from the given data point to the triangular surface, which vector N is normal to the triangular surface.

In step S15d, after step S15c, the dot product of the vector V with a vector from the vertex of the tetrahedron not included in the triangular surface to one of the vertices of the triangular surface is taken.

In step S15e, after step S15d a determination is made as to whether or not the dot product taken in step S15d is positive.

If, for each surface of the tetrahedron, it is determined in step S15e that the dot product taken in step S15d is positive, then the given data point lies within the tetrahedron.

If, in step S15, it is determined that the given data point lies inside one of the n+1 surfaced figures defined by all possible combinations of n+1 of the data points selected in step S14, then, at step S16, the method provides an indication at the screen 14 and/or the printer 16 that is appropriate given that the data point most likely belongs to the first population. In the color analysis application, where the first population contains data points that are "acceptable," the method provides an indication at the screen 14 and/or the printer 16 that the color represented by the given data point $(x_1, x_2, x_3)$ is likely acceptable.

Alternatively, if, in step S15, it is determined that the given data point does not lie inside any one of the n+1 surfaced figures defined by all possible combinations of n+1 of the data points selected in step S14, then, at step S17, the method provides an indication at the screen 14 and/or the printer 16 that is appropriate given that the data point may not belong to the first population. In the color analysis application, where the first population contains data points that are "acceptable," and where the given data point ($x_1$, $x_2$, $x_3$) has not been found to belong to either the first "acceptable" population or the second "not acceptable" population, the method concludes that the given data point may belong to the second population and provides an indication at the screen 14 and/or the printer 16 that the color represented by the given data point ($x_1$, $x_2$, $x_3$) requires visual inspection.

A numerical example illustrating how steps S15a through S15e are carried out will now be set forth.

Assume that the method is being used with data points having three parameters, such as data points representing color samples. Also assume that one combination of four data points of the data points Selected in step S14 consists of the data points (0, 0, 0), 4, 0, 0), 0, 4, 0), and (0, 0, 4).

These four points define a tetrahedron with four triangular surfaces defined as follows:

Surface 1 is the triangular surface defined by the data points (0, 0, 0), (4, 0, 0), and (0, 4, 0);

Surface 2 is the triangular surface defined by the data points (0, 0, 0), (4, 0, 0), and (0, 0, 4);

Surface 3 is the triangular surface defined by the data points (0, 0, 0), (0, 4, 0), and (0, 0, 4); and Surface 4 is the triangular surface defined by the data points (4, 0, 0), (0, 4, 0), and (0, 0, 4).

Assume that the given data point consists of the data point (1, 1, 1) and that it is desired in step S15 to determine whether this data point lies within the tetrahedron or without.

Surface 1 (defined by data points (0, 0, 0), (4, 0, 0), and (0, 4, 0))

Step 15a

In three dimensions, two orthogonal vectors are necessary to specify surface 1. One of the orthogonal vectors can be taken to be a side of surface 1. Thus, one of the orthogonal vectors may be taken to be:

$(4i+0j+0k)-(0i+0j+0k)=4i$

This vector can be normalized to give a unit vector which will be:

i

A vector orthogonal to this vector i can be established using another side of surface 1 and taking its component normal to this vector i as follows:

$(0i+4j30\ 0k)-(0i+0j+0k)=4j$

This vector can be normalized to give a unit vector which will be:

j

Since this unit vector J is perpendicular to the first unit vector (their dot product is zero), step S15a has been completed.

Step S15b

A vector V is defined from the given point (1, 1, 1) to any point on surface 1. Vector V may be established as: $V=(i+j+k)-(0i+0j+0k)=i+j+k$

Step S15c

All components of vector V parallel to surface 1 are subtracted from the vector V to define a normal vector N from the given data point to surface 1 as follows:

$N=(i+j+k)-(i+j+k)\cdot(i)(i)-(i+j+k)\cdot(j)(j)=i+j+k-i-J=k$

Step S15d

A vector from the data point not included in surface 1 to surface 1 is defined by:

$(0i+0j+4k)-(0i+0j+0k)=4k$

The dot product of this vector with the normal vector N is: ps $4k\cdot k=4$

Step S15e

A determination is made as to whether or not the dot product of the vector N with the vector from the data point not included in surface 1 to surface 1 is positive as follows:

$4\leq 0$

Thus, for surface 1, the given point lies on the inside.

Surface 2 (defined by data points (0, 0, 0, (4, 0, 0), and (0, 0, 4))

Step 15a

Two orthogonal vectors are necessary to specify surface 2. One of the orthogonal vectors can be taken to be a side of surface 2. Thus, one of the orthogonal vectors may be taken to be:

$(4i+0j+0k)-(0i+0j+0k)=4i$

This vector can be normalized to give a unit vector which will be:

i

A vector orthogonal to this vector i can be established using another side of surface 2 and taking its component normal to this vector i as follows:

$(0i+0j+4k)-(0i+0j+0k)=4k$

This vector can be normalized to give a unit vector which will be:

k

Since this unit vector k is perpendicular to the first unit vector (their dot product is zero), step S15a has been completed.

Step S15b

A vector V is defined from the given point (1, 1, 1) to any point on surface 2. Vector V may be established as:

$V=(i+j+k)-(0i+0j+0k=i+j+k$

Step S15c

All components of vector V parallel to surface 2 are subtracted from the vector V to define a normal vector N from the given data point to surface 2 as follows:

$N=(i+j+k)-(i+j+k)\cdot(i)(i)-(i+j+k)\cdot(k)(k)=i+j+k-i-k=j$

Step S15d

A vector from the data point not included in surface 2 to surface 2 is defined by:

$(0i+4j+0k)-(0i+0j+0k)=4j$

The dot product of this vector with the normal vector N is:

$4j \cdot j = 4$

Step S15e

A determination is made as to whether or not the dot product of the vector N with the vector from the data point not included in surface 2 to surface 2 is positive as follows:
$4 > 0$
Thus, for surface 2, the given point lies on the inside.

Surface 3 (defined by data points (0, 0, 0), (0, 4, 0), and (0, 0, 4))

Step 15a

Two orthogonal vectors are necessary to specify surface 3. One of the orthogonal vectors can be taken to be a side of surface 3. Thus, one of the orthogonal vectors may be taken to be:

$(0i+4j+0k)-(0i+0j+0k)=4j$

This vector can be normalized to give a unit vector which will be:
$j$

A vector orthogonal to this vector J can be established using another side of surface 3 and taking its component normal to this vector J as follows:

$(0i+0j+4k)-(0i+0j+0k)=4k$

This vector can be normalized to give a unit vector which will be:
$k$

Since this unit vector k is perpendicular to the first unit vector (their dot product is zero), step S15a has been completed.

Step S15b

A vector V is defined from the given point (1, 1, 1) to any point on surface 3. Vector V may be established as:

$V=(i+j+k)-(0i+0j+0k)=i+j+k$

Step S15c

All components of vector V parallel to surface 3 are subtracted from the vector V to define a normal vector N from the given data point to surface 3 as follows:

$N=(i+j+k)-(i+J+k)\cdot(j)(j)-(i+j+k)\cdot(k)(k)=i+j+k-j-k=i$

Step S15d

A vector from the data point not included in surface 3 to surface 3 is defined by:

$(4i+0j+0k)-(0i+0j+0k)=4i$

The dot product of this vector with the normal vector N is:

$4i \cdot i = 4$

Step S15e

A determination is made as to whether or not the dot product of the vector N with the vector from the data point not included in surface 3 to surface 3 is positive as follows:

$4 > 0$

Thus, for surface 3, the given point lies on the inside.

Surface 4 (defined by data points (4, 0, 0), (0, 4, 0), and (0, 0, 4))

Step 15a

Two orthogonal vectors are necessary to specify surface 4. One of the orthogonal vectors can be taken to be a side of surface 4. Thus, one of the orthogonal vectors may be taken to be:

$(0i+4j+0k)-(4i+0j+0k)=4j-4i$

This orthogonal vector can be normalized to give a unit vector which will be:
$-(2)^{-0.5}i+(2)^{-0.5}j$ A vector orthogonal to this vector $-(2)^{-0.5}i+(2)^{-0.5}j$ can be established using another side of surface 4:

$(0i+0j+4k)-(4i+0j+0k)=4k-4i$

The component of the vector $4k-4i$ in a direction parallel to the vector $-(2)^{-0.5}i+(2)^{-0.5}j$ is:

$(4k-4i)\cdot(-(2)^{-0.5}i+(2)^{0.5}j)(-(2)^{-0.5}i+(2)^{-0.5}j)=-2i+2j$

The component of the vector $-2i+2j$ that is orthogonal to the vector $4k-4i$ is:

$4k-4i-(-2i+2j)=4k-2i-2j$

This vector can be normalized to give a unit vector which will be:
$(-2i-2j+4k)/(24)^{0.5}$ Since this unit vector $(-2i-2j+4k)/(24)^{0.5}$ is perpendicular to the first unit vector (their dot product is zero), step S15a has been completed.

Step S15b

A vector V is defined from the given point (1, 1, 1) to any point on surface 4. Vector V may be established as:

$V=(i+j+k)-(4i+0j+0k)=-3i+j+k$

Step S15c

All components of vector V parallel to surface 4 are subtracted from the vector V to define a normal vector N from the given data point to surface 4 as follows:

$$\begin{aligned} N &= (-3i+j+k)-(-3i+j+k) \times \\ &\quad (-(2)^{-0.5}i+(2)^{-0.5}j)(-(2)^{-0.5}i+ \\ &\quad (2)^{-0.5}j)-(-3i+j+k) \times \\ &\quad (-2i-2j+4k)(-2i-2j+4k)/24 \\ &= (-3i+j+k)-(-2i+2j)- \\ &\quad (-2i-2j+4k)/3 \\ &= (-1i-1j-1k)/3 \end{aligned}$$

Step S15d

A vector from the data point not included in surface 4 to surface 4 is defined by:

$(0i+0j+0k)-(4i+0j+0k)=-4j$

The dot product of this vector with the normal vector N is:

$$-4i \cdot (-1i-1j-1k)/3 = 4/3$$

Step S15e

A determination is made as to whether or not the dot product of the vector N with the vector from the data point not included in surface 4 to surface 4 is positive as follows:

4/3>0

Thus, for surface 4, the given point lies on the inside.

Thus, since the given data point (1, 1, 1) lies inside of each of the surfaces of the tetrahedron, it lies inside the tetrahedron.

As should be apparent to one of ordinary skill in the art, step S15 of the method can be used in an application involving any number n of parameters.

For example, assume that the method is being used with data points having four parameters. Also assume that one combination of five data points of the data points selected in step S14 consists of the data points (0, 0, 0, 0), (5, 0, 0, 0), (0, 5, 0, 0), (0, 0, 5, 0) and (0, 0, 0, 5).

These four points define a figure with five surfaces defined as follows:

Surface 1 is the surface defined by the data points (0, 0, 0, 0), (5, 0, 0, 0), (0, 5, 0, 0), and (0, 0, 5, 0);

Surface 2 is the surface defined by the data points (0, 0, 0, 0), (5, 0, 0, 0), (0, 5, 0, 0), and (0, 0, 0, 5);

Surface 3 is the surface defined by the data points (0, 0, 0, 0), (0, 5, 0, 0), (0, 0, 5, 0), and (0, 0, 0, 5);

Surface 4 is the surface defined by the data points (0, 0, 0, 0), (5, 0, 0, 0), (0, 0, 5, 0), and (0, 0, 0, 5); and Surface 5 is the surface defined by the data points (5, 0, 0, 0), (0, 5, 0, 0), (0, 0, 5, 0), and (0, 0, 0, 5).

Assume that the given data point consists of the data point (1, 1, 1, 1) and that it is desired in step S15 to determine whether this data point lies within the above-defined figure or without.

Surface 1 (defined by data points (0, 0, 0, 0), (5, 0, 0, 0), (0, 5, 0, 0), and (0, 0, 5, 0))

Step 15a

In four dimensions, three orthogonal vectors are necessary to specify surface 1. One of the orthogonal vectors can be taken to be a side of surface 1. Thus, one of the orthogonal vectors may be taken to be:

$$(5i+0j+0k+0l)-(0i+0j+0k+0l)=5i$$

This vector can be normalized to give a unit vector which will be:

i

A vector orthogonal to this vector i can be established using another side of surface 1 and taking its component normal to this vector i as follows:

$$(0i+5j+0k+0l)-(0i+0j+0k+0l)=5j$$

This vector can be normalized to give a unit vector which will be:

j

A vector orthogonal to each of the vectors i and j can be established using another side of surface 1 and taking its component normal to vector i or vector j as follows:

$$(0i+0j+5k+0l)-(0i+0j+0k+0l)=5k$$

This vector can be normalized to give a unit vector which will be:

k

Since the unit vectors i, j, and k are perpendicular to one another (the dot products of i with j, i with k, and j with k are all zero), step S15a has been completed.

Step S15b

A vector V is defined from the given point (1, 1, 1, 1) to any point on surface 1. Vector V may be established as:

$$V=(i+j+k+l)-(0i+0j+0k+0l)=i+j+k+l$$

Step S15c

All components of vector V parallel to surface 1 are subtracted from the vector V to define a normal vector N from the given data point to surface 1 as follows:

$$\begin{aligned} N &= (i+j+k+l)-(i+j+k+l)\times(i)(i)- \\ &\quad (i+j+k+l)\times(j)(j)-(i+j+k+l)\times(k)(k) \\ &= i+j+k+l-i-j-k=l \end{aligned}$$

Step S15d

A vector from the data point not included in surface 1 to surface 1 is defined by:

$$(0i+0j+0k+5l)-(0i+0j+0k+0l)=5l$$

The dot product of this vector with the normal vector N is:

$$5l \cdot 1 = 5$$

Step S15e

A determination is made as to whether or not the dot product of the vector N with the vector from the data point not included in surface 1 to surface 1 is positive as follows:

5>0

Thus, for surface 1, the given point lies on the inside.

Surface 2 (defined by data points (0, 0, 0, 0), (5, 0, 0, 0), (0, 5, 0, 0), and (0, 0, 0, 5))

Step 15a

Three orthogonal vectors are necessary to specify surface 2. One of the orthogonal vectors can be taken to be a side of surface 2. Thus, one of the orthogonal vectors may be taken to be:

$$(5i+0j+0k+0l)-(0i+0j+0k+0l)=5i$$

This vector can be normalized to give a unit vector which will be:

i

A vector orthogonal to this vector i can be established using another side of surface 2 and taking its component normal to this vector i as follows:

$$(0i+5j+0k+0l)-(0i+0j+0k+0l)=5j$$

This vector can be normalized to give a unit vector which will be:

j

A vector orthogonal to each of the vectors i and j can be established using another side of surface 2 and taking its component normal to vector i or vector J as follows:

$$(0i+0j+0k+5l)-(0i+0j+0k+0l)=5l$$

This vector can be normalized to give a unit vector which will be:

l

Since the unit vectors i, j, and l are perpendicular to one another (the dot products of i with j, i with l, and j with l are all zero), step S15a has been completed.

Step S15b

A vector V is defined from the given point (1, 1, 1, 1) to any point on surface 2. Vector V may be established as:

$$V=(i+j+k+l)-(0i+0j+0k+0l)=i+j+k+l$$

Step S15c

All components of vector V parallel to surface 2 are subtracted from the vector V to define a normal vector N from the given data point to surface 2 as follows:

$$\begin{aligned} N &= (i+j+k+l)-(i+j+k+l)\times(i)(i)- \\ &\quad (i+j+k+l)\times(j)(j)-(i+j+k+l)\times(l)(l) \\ &= i+j+k+l-i-j-l=k \end{aligned}$$

Step S15d

A vector from the data point not included in surface 2 to surface 2 is defined by:

$$(0i+0j+5k+0l)-(0i+0j+0k+0l)=5k$$

The dot product of this vector with the normal vector N is:

$$5k\cdot k=5$$

Step S15e

A determination is made as to whether or not the dot product of the vector N with the vector from the data point not included in surface 2 to surface 2 is positive as follows:

5>0

Thus, for surface 2, the given point lies on the inside.

Surface 3 (defined by data points (0, 0, 0, 0), (0, 5, 0, 0), (0, 0, 5, 0), and . . . (0, 0, 0, 5))

Step 15a

Three orthogonal vectors are necessary to specify surface 3. One of the orthogonal vectors can be taken to be a side of surface 3. Thus, one of the orthogonal vectors may be taken to be:

$$(0i+5j+0k+0l)-(0i+0j+0k+0l)=5j$$

This vector can be normalized to give a unit vector which will be:

j

A vector orthogonal to this vector J can be established using another side of surface 3 and taking its component normal to this vector j as follows:

$$(0i+0j+5k+0l)-(0i+0j+0k+0l)=5k$$

This vector can be normalized to give a unit vector which will be:

k

A vector orthogonal to each of the vectors J and k can be established using another side of surface 3 and taking its component normal to vector j or vector k as follows:

$$(0i+0j+0k+5l)-(0i+0j+0k+0l)=5l$$

This vector can be normalized to give a unit vector which will be:

l

Since the unit vectors j, k, and l are perpendicular to one another (the dot products of j with k, j with l, and k with l are all zero), step S15a has been completed.

Step S15b

A vector V is defined from the given point (1, 1, 1, 1) to any point on surface 3. Vector V may be established as:

$$V=(i+j+k+l)-(0i+0j+0k+0l)=i+j+k+l$$

Step S15c

All components of vector V parallel to surface 3 are subtracted from the vector V to define a normal vector N from the given data point to surface 3 as follows:

$$\begin{aligned} N &= (i+j+k+l)-(i+j+k+l)\times(j)(j)- \\ &\quad (i+j+k+l)\times(k)(k)-(i+j+k+l)\times(l)(l) \\ &= i+j+k+l-j-k-l=i \end{aligned}$$

Step S15d

A vector from the data point not included in surface 3 to surface 3 is defined by:

$$(5i+0j+0k+0l)-(0i+0j+0k+0l)=5i$$

The dot product of this vector with the normal vector N is:

$$5i\cdot i=5$$

Step S15e

A determination is made as to whether or not the dot product of the vector N with the vector from the data point not included in surface 3 to surface 3 is positive as follows:

5>0

Thus, for surface 3, the given point lies on the inside.

Surface 4 (defined by data points (0, 0, 0, 0), (5, 0, 0, 0), (0, 0, 5, 0), and (0, 0, 0, 5))

Step 15a

Three orthogonal vectors are necessary to specify surface 4. One of the orthogonal vectors can be taken to be a side of surface 4. Thus, one of the orthogonal vectors may be taken to be:

$$(5i+0j+0k+0l)-(0i+0j+0k+0l)=5i$$

This vector can be normalized to give a unit vector which will be:

i

A vector orthogonal to this vector i can be established using another side of surface 4 and taking its component normal to this vector i as follows:

$$(0i+0j+5k+0l)-(0i+0j+0k+0l)=5k$$

This vector can be normalized to give a unit vector which will be:

k

A vector orthogonal to each of the vectors i and k can be established using another side of surface 4 and taking its component normal to vector i or vector k as follows:

$$(0i+0j+0k+5l)-(0i+0j+0k+0l)=5l$$

This vector can be normalized to give a unit vector which will be:

l

Since the unit vectors i, k, and l are perpendicular to one another (the dot products of i with k, i with l, and k with l are all zero), step S15a has been completed.

Step S15b

A vector V is defined from the given point (1, 1, 1, 1) to any point on surface 4. Vector V may be established as:

$$V=(i+j+k+l)-(0i+0j+0k+0l)=i+j+k+l$$

Step S15c

All components of vector V parallel to surface 4 are subtracted from the vector V to define a normal vector N from the given data point to surface 4 as follows:

$$\begin{aligned} N &= (i+j+k+l)-(i+j+k+l)\times(i)(i)- \\ &\quad (i+j+k+l)\times(k)(k)-(i+j+k+l)\times(l)(l) \\ &= i+j+k+l-i-k-l=j \end{aligned}$$

Step S15d

A vector from the data point not included in surface 4 to surface 4 is defined by:

$$(0i+5j+0k+0l)-(0i+0j+0k+0l)=5j$$

The dot product of this vector with the normal vector N is:

$$5j \cdot j = 5$$

Step S15e

A determination is made as to whether or not the dot product of the vector N with the vector from the data point not included in surface 4 to surface 4 is positive as follows:

5>0

Thus, for surface 4, the given point lies on the inside.

Surface 5 (defined by data points (5, 0, 0, 0), (0, 5, 0, 0), (0, 0, 5, 0), and (0, 0, 0, 5))

Step 15a

Three orthogonal vectors are necessary to specify surface 5. One of the orthogonal vectors can be taken to be a side of surface 5. Thus, one of the orthogonal vectors may be taken to be:

$$(0i+5j+0k+0l)-(5i+0j+0k+0l)=-5i+5j$$

This vector can be normalized to give a unit vector which will be:

$$-i/(2^{0.5})+j/(2^{0.5})$$

A vector orthogonal to this vector $-i/(2^{0.5})+j/(2^{0.5})$ can be established using another side of surface 5 and taking its component normal to this vector $-i/(2^{0.5})+j/(2^{0.5})$ as follows:

$$-5i+5k-(-5i+5k)\cdot(-i/(2^{0.5})+j/(2^{0.5}))(-i/(2^{0.5})+j/(2^{0.5}))$$

$$=-5i+5k-(-5i/2+5j/2)=-5i/2-5j/2+5k$$

This vector can be normalized to give a unit vector which will be:

$$-i/(6^{0.5})-j/(6^{0.5})+2k/(6^{0.5})$$

A vector orthogonal to each of the vectors $-5i/2-5j/2+5k$ and $-i/(6^{0.5})-j/(6^{0.5})+2k/(6^{0.5})$ can be established using another side of surface 5 and taking its component normal to the vector $-5i/2-5j/2+5k$ and to the vector $-i/(6^{0.5})-j/(6^{0.5})+2k/(6^{0.5})$ as follows:

$$(-5i+5l)-(-5i+5l)\cdot(-i/(2^{0.5})+j/(2^{0.5}))(-i/(2^{0.5})+$$

$$j/(2^{0.5}))-(-5i+5l)\cdot(-i/(6^{0.5})-j/(6^{0.5})+$$

$$2k/(6^{0.5}))(-i/(6^{0.5})-j/(6^{0.5})+2k/(6^{0.5}))=$$

$$(-5i+5l)-(-5i/2+5j/2)-5(-i-j+2k)/6=$$

$$-5i/2-5j/2-5k/2+5l$$

This vector can be normalized to give a unit vector which will be:
$-i/(12^{0.5})-j/(12^{0.5})-k/(12^{0.5})-l/(12^{0.5})$ Since the unit vectors are perpendicular to one another (the dot product of any one of them with another one of them is zero), step S15a has been completed.

Step S15b

A vector V is defined from the given point (1, 1, 1, 1) to any point on surface 5. Vector V may be established as:

$$V=(i+j+k+l)-(5i+0j+0k+0l)=-4i+j+k+l$$

Step S15c

Find the components of the vector V that are parallel to each of the unit orthogonal vectors by taking the respective dot products of the vector V with each of the unit orthogonal vectors.

The dot product of the vector V with the unit orthogonal vector $-i/(2^{0.5})+j/(2^{0.5})$ is:

$$(-4i+j+k+l)\cdot(-i/(2^{0.5})+j/(2^{0.5}))=4/(2^{0.5})+1/(2^{0.5})=5/(2^{0.5})$$

The dot product of the vector V with the unit orthogonal vector $-i/(6^{0.5})-j/(6^{0.5})+2k/(6^{0.5})$ is:

$$(-4i+j+k+l)\cdot(-i/(6^{0.5})-j/(6^{0.5})+2k/(6^{0.5}))=$$

$$4/(6^{0.5})-1/(6^{0.5})+2/(6^{0.5})=5/(6^{0.5})$$

The dot product of the vector V with the unit orthogonal vector $-i/(12^{0.5})-j/(12^{0.5})-k/(12^{0.5})+3l/(12^{0.5})$ is:

$$(-4i+j+k+l)\cdot(-i/(12^{0.5})-j/(12^{0.5})-k/(12^{0.5})+3l/(12^{0.5}))$$

$$=4/(12^{0.5})-1/(12^{0.5})-1/(12^{0.5})+3/(12^{0.5})=5/(12^{0.5})$$

The components of the vector V parallel to surface 5 are as follows:

$$(5/(2^{0.5}))(-i/(2^{0.5}) + j/(2^{0.5})) =$$

$$-5i/2 + 5j/2(5/(6^{0.5}))(-i/(6^{0.5}) - j/(6^{0.5}) + 2k/(6^{0.5})) =$$

$$-5i/6 - 5j/6 + 5k/3(5/(12^{0.5}))(-i/(12^{0.5}) - j/(12^{0.5}) -$$

$$k/(12^{0.5}) + 3l/(12^{0.5})) = -5i/12 - 5j/12 - 5k/12 + 5l/4$$

All components of vector V parallel to surface 5 are subtracted from the vector V to define a normal vector N from the given data point to surface 5 as follows:

$$\begin{aligned} N &= (-4i + j + k + l) - (-5i/2 + 5j/2 - 5i/6 - \\ & \quad 5j/6 + 5k/3 - 5i/12 - 5j/12 - 5k/12 + 5l/4) \\ &= -3i/12 - 3j/12 - 3k/12 - 3l/12 \end{aligned}$$

Step S15d

A vector from the data point not included in surface 5 to surface 5 is defined by:

$$(0i+0j+0k+0l)-(5i+0j+0k+0l)=-5i$$

The dot product of this vector with the normal vector N is:

$$-5i\cdot(-3i/12-3j/12-3k/12-3l/12)=15/12$$

Step S15e

A determination is made as to whether or not the dot product of the vector N with the vector from the data point not included in surface 5 to surface 5 is positive as follows:

15/12>0

Thus, for surface 5, the given point lies on the inside.

Thus, since the given data point (1, 1, 1, 1) lies inside of each of the surfaces of the figure, it lies inside the figure.

Thus, a novel method is provided for classifying data in any n-dimensional space. As previously stated, the invention has application to many classification problems and can be used with any number of classifications, and any number of parameters. The invention can be used to solve classification problems where populations are not normally distributed, such as the problem of FIG. 11.13 on p. 530 of *Applied Multivariate Statistical Analysis*. With regard to color, the method is advantageous in that only a few data points that have previously classified as "acceptable" are needed. The method is conservative and minimizes the probability of accepting a "marginal" or "rejected" color. Further, with regard to color, the method is a true three dimensional approach and does not suffer any of the problems that can occur when trying to fit two-dimensional ellipses around data points in three dimensional space. The method is also superior to any method that attempts to fit a large three dimensional ellipsoid around data points classified as "acceptable" since those large ellipsoids by their symmetrical nature inherently include substantial regions where there are no data points, resulting in a much higher risk of classifying a given data point as "acceptable" when it should be classified as "rejected" or "marginal".

Various of the features of the invention are set forth in the following claims.

We claim:

1. A method of classifying a color sample by determining if the sample has a color which falls within a population defined by at least four known data points which each represent a color, the known data points being defined using three color parameters, said method comprising the following steps in order:

providing a color measuring apparatus;

using the color measuring apparatus on the sample to measure the three parameters of the sample and to thereby define a given data point defining the color of the sample;

defining a tetrahedron having four vertices, each of the vertices of the tetrahedron being defined by one of the known data points;

determining if the given data point lies within the tetrahedron; and indicating a classification of the sample depending on whether the given data point lies within the tetrahedron.

2. A method in accordance with claim 1 wherein said tetrahedron defining step is performed without limiting the size of the tetrahedron.

3. A method in accordance with claim 1 and further comprising, prior to said tetrahedron defining step, the step of calculating the respective standard deviations for each of the parameters for all the data points in the population, and wherein the tetrahedron is defined such that, for each of the parameters, each of the vertices of the tetrahedron is within a predetermined distance from the given data point, the predetermined distance for each of the parameters being a function of the calculated standard deviation for the parameter.

4. A method in accordance with claim 1 wherein the three parameters consist of a red/green parameter ($a^*$), a yellow/blue parameter ($b^*$), and a lightness parameter ($L^*$).

5. A method in accordance with claim 4 wherein the measuring apparatus is selected from the group consisting of a colorimeter, a spectrophotometer, and an abridged spectrophotometer.

6. A method in accordance with claim 1 and further comprising the step of, prior to said tetrahedron defining step, determining if the given data point is in close proximity to any of the known data points.

7. A method in accordance with claim 6 wherein said step of determining if the given data point is in close proximity to any of the known data points comprises the step of calculating the respective standard deviations for each of the parameters for all of the known data points and defining the given data point as being in close proximity to a selected one of the known data points if, for each of the parameters, the given data point is within a predetermined distance from the selected one of the known data points, the predetermined distance for each of the parameters being a function of the calculated standard deviation for the parameter.

8. A method in accordance with claim 6 wherein said step of determining if the given data point is in close proximity to any of the known data points comprises the following steps in order:

determining which of the known data points is closest to the given data point;

defining an ellipsoidal neighborhood around the closest data point; and determining if the given data point is in the ellipsoidal neighborhood.

9. A method as set forth in claim 1 wherein said indicating step includes the step of indicating that the sample falls within the population if the given data point lies within the tetrahedron.

10. A method as set forth in claim 1 wherein said indicating step includes the step of classifying the sample as "acceptable" if the given data point lies within the tetrahedron.

11. A method of classifying a color sample by determining if the sample falls within a population defined by more than four known data points, each known data point having three parameters, said method comprising the step of using a measuring device to measure at least three parameters of the sample, the three measured parameters defining a given data point, and determining if the given data point falls within any of a plurality of tetrahedrons, each of the tetrahedrons having four vertices, each of the vertices of each tetrahedron being defined by one of the known data points, and signalling a classification of the sample depending on whether the given data point falls within any of the tetrahedrons.

12. A method in accordance with claim 11 and further comprising the step of, prior to said step of determining if the given data point falls within any of a plurality of tetrahedrons, determining if the given data point is in close proximity to any of the known data points.

13. A method as set forth in claim 11 wherein said signalling step includes the step of signalling that the sample falls within the population if the given data point lies within any of the tetrahedrons.

14. A method as set forth in claim 11 wherein said signalling step includes the step of classifying the sample as "acceptable" if the given data point lies within any of the tetrahedrons.

15. A method of determining if a sample falls within a population defined by more than four known data points, each known data point having three parameters, said method comprising the step of using a measuring device to measure at least three parameters of the sample, the three measured parameters defining a given data point, determining if the given data point is in close proximity to any of the known data points, wherein said step of determining if the given data point is in close proximity to any of the known data points comprises the step of calculating the respective standard deviations for each of the parameters for all of the known data points and defining the given data point as being in close proximity to a selected one of the known data points if, for each of the parameters, the given data point is within a predetermined distance from the selected one of the known data points, the predetermined distance for each of the parameters being a function of the calculated standard deviation for the parameter, said method further comprising the steps of determining if the given data point falls within any of a plurality of tetrahedrons, each of the tetrahedrons having four vertices, each of the vertices of each tetrahedron being defined by one of the known data points, and signaling that the sample falls within the population if the given data point falls within any of the tetrahedrons.

16. A method of determining if a sample falls within a population defined by more than four known data points, each known data point having three parameters, said method comprising the step of using a measuring device to measure at least three parameters of the sample, the three measured parameters defining a given data point, determining if the given data point is in close proximity to any of the known data points, determining if the given data point falls within any of a plurality of tetrahedrons, each of the tetrahedrons having four vertices, each of the vertices of each tetrahedron being defined by one of the known data points, and signalling that the sample falls within the population if the given data point falls within any of the tetrahedrons, wherein said step of determining if the given data point is in close proximity to any of the known data points comprises the following steps in order:

determining which of the known data points is closest to the given data point;

defining an ellipsoidal neighborhood around the closest data point; and determining if the given data point is in the ellipsoidal neighborhood.

17. A method of classifying a sample having n measurable parameters by determining if the sample falls within a population defined by at least n+1 known data points, each known data point having the n parameters, n being at least 2, said method comprising the following steps in order:

using a measuring device to define a given data point by measuring the n measurable parameters of the sample;

using a microprocessor to define a triangle having three vertices, each of the vertices of the triangle being defined by two of the parameters of respective ones of the known data points, the same two parameters being used to define each of the vertices;

using the microprocessor to determine if the given data point lies within the triangle with regard to the same two parameters; and indicating a classification of the sample depending on whether the given data point lies within the triangle.

18. A method in accordance with claim 17 and further comprising the step of, prior to said triangle defining step, determining if the given data point is in close proximity to any of the known data points.

19. A method as set forth in claim 17 wherein said indicating step includes the step of indicating that the sample falls within the population if the given data point lies within the triangle.

20. A method as set forth in claim 17 wherein said indicating step includes the step of classifying the sample as "acceptable" if the given data point lies within the triangle.

21. A method of determining if a sample having n measurable parameters falls within a population defined by at least n+1 known data points, each known data point having the n parameters, n being at least 2, said method comprising the following steps in order:

using a measuring device to define a given data point by measuring the n measurable parameters of the sample;

determining if the given data point is in close proximity to any of the known data points; wherein said step of determining if the given data point is in close proximity to any of the known data points comprises the step of calculating the respective standard deviations for each of the parameters for all of the known data points and defining the given data point as being in close proximity to a selected one of the known data points if, for each of the parameters, the given data point is within a predetermined distance from the selected one of the known data points, the predetermined distance for each of the parameters being a function of the calculated standard deviation for the parameter;

using a microprocessor to define a triangle having three vertices, each of the vertices of the triangle being defined by two of the parameters of respective ones of the known data points, the same two parameters being used to define each of the vertices; using the microprocessor to determine if the given data point lies within the triangle with regard to the same two parameters; and indicating that the sample falls within the population if the given data point lies within the triangle.

22. A method of determining if a sample having n measurable parameters falls within a population defined by at least n+1 known data points, each known data point having the n parameters, n being at least 2, said method comprising the following steps in order:

using a measuring device to define a given data point by measuring the n measurable parameters of the sample;

determining if the given data point is in close proximity to any of the known data points;

using a microprocessor to define a triangle having three vertices, each of the vertices of the triangle being defined by two of the parameters of respective ones of the known data points, the same two parameters being used to define each of the vertices; using the microprocessor to determine if the given data point lies within the triangle with regard to the same two parameters; and indicating that the sample falls within the population if the given data point lies within the triangle;

wherein said step of determining if the given data point is in close proximity to any of the known data points comprises the following steps in order:

determining which of the known data points is closest to the given data point;

defining a neighborhood around the closest data point, the neighborhood being elliptical with regard to the same two parameters; and determining if the given data point is in the elliptical neighborhood with regard to the same two parameters.

23. A method of determining if a sample having n measurable parameters falls within a population defined by at least n+1 known data points, each known data point having the n parameters, said method comprising the following steps:

using a measuring apparatus to define a given data point by measuring the n measurable parameters;

using a microprocessor to define a first vector from the given data point to any data point on a surface defined by n data points of the n+1 known data points, using a microprocessor to determine the component of the first vector along the normal to the surface defined by the n data points, and using a microprocessor to define a second vector from the n+1 data point to the surface defined by the n data points;

using a microprocessor to calculate the dot product of the component of the first vector along the normal and the second vector, after said step of defining the first and second vectors;

using a microprocessor to determine whether the calculated dot product is positive or negative after said calculating step; and providing a signal indicating that the sample falls within the population depending on whether the calculated dot product is positive or negative.

24. A method in accordance with claim 23 wherein all of said steps are performed for each surface defined by each possible combination of n data points of the n+1 known data points, said method further comprising the step of defining the given data point as falling within the population if all of the calculated dot products are determined to be positive.

25. A method in accordance with claim 23 wherein the point on the surface to which the first vector is defined from the given data point is one of the n known data points defining the surface.

26. A method of determining if a sample having at least three measurable parameters falls within a population defined by known data points, each known data point having the three parameters, said method comprising the following steps:

defining a given data point by measuring the three parameters for the sample;

providing a microprocessor;

using the microprocessor to calculate the respective standard deviations for each of the parameters for all of the known data points;

using the microprocessor to determine which of the known data points is closest to the given data point; and after said calculating step and said determining step, providing an indication that the given data point is within the population if, for each of the parameters, the given data point is within a predetermined distance from the determined closest known data point, the predetermined distance for each of the parameters being a function of the calculated standard deviation for the parameter.

27. A method in accordance with claim 26 wherein said step of providing a measuring device and using the measuring device to measure the three parameters for the given data point comprises the step of providing a color measuring device and using the color measuring device to measure three parameters relating to color.

28. A method in accordance with claim 27 wherein the three parameters consist of a red/green parameter (a*), a yellow/blue parameter (b*), and a lightness parameter (L*).

29. A method in accordance with claim 28 wherein the measuring apparatus is selected from the group consisting of a colorimeter, a spectrophotometer, and an abridged spectrophotometer.

30. A method of determining if a given data point representing sensed color and having three parameters should be considered to be "acceptable", said method comprising the following steps:

(a) defining the given data point by measuring the three parameters for the given data point using a measuring apparatus selected from the group consisting of a colorimeter, a spectrophotometer, and an abridged spectrophotometer, and by using an analog to digital converter to convert analog measured signals to digital to define the given data point, the three parameters being color parameters;

(b) providing a microprocessor connected to said measuring apparatus, providing a database containing a first population of at least four data points that each represent a color known to have been classified as "acceptable", and containing a second population of data points that each represent a color known not to have been classified as "acceptable", and providing a memory useable by the microprocessor and storing the database;

(c) using the microprocessor to determine, after step (b), which of the data points of the second population is closest to the given data point;

(d) using the microprocessor to define, after step (c), an ellipsoidal neighborhood around the closest data point of the second population;

(e) using the microprocessor to determine, after step (d) if the given data point is in the ellipsoidal neighborhood defined in step (d), and if so, visually indicating that the given data point can not be automatically considered to be "acceptable", and if not, proceeding to step (f);

(f) using the microprocessor to determine which of the data points of the first population is closest to the given data point;

(g) using the microprocessor to define, after step (f), an ellipsoidal neighborhood around the closest data point of the first population;

(h) using the microprocessor to determine, after step (g) if the given data point is in the ellipsoidal neighborhood defined in step (g), and if so, visually indicating that the given data point can automatically be considered "acceptable", and if not, proceeding to step (i); and (i) using the microprocessor to determine if the given data point falls within any of a plurality of tetrahedrons, each of the tetrahedrons having four vertices, each of the vertices of each tetrahedron being defined by one of the data points of the first population, and if so, visually indicating that the given data point can be automatically considered "acceptable", and if not, visually indicating that the given data point can not be automatically considered to be "acceptable".

31. A method in accordance with claim 30 wherein step (i) is performed without limiting the size of any of the tetrahedrons included in the plurality of tetrahedrons.

32. A method in accordance with claim 30 and further comprising, after step (a) and prior to step (i), the step of calculating the respective standard deviations for each of the parameters for all the data points in the first population, and wherein, in step (i), the plurality of tetrahedrons is a subset of all possible tetrahedrons that could be defined using the data points of the first population, each tetrahedron of the subset being defined such that, for each of the parameters, each of the vertices of the tetrahedron is within a predetermined distance from the given data point, the predetermined distance for each of the parameters being a function of the calculated standard deviation for the parameter.

33. A method in accordance with claim 30 wherein the three parameters consist of a red/green parameter (a*), a yellow/blue parameter (b*), and a lightness parameter (L*).

34. An apparatus for classifying a given data point having at least three parameters by determining if the given data point falls within a population defined by at least four known data points, each data point having the three parameters, said apparatus comprising:

a microprocessor;

means including said microprocessor for defining a tetrahedron having four vertices, each of the vertices of the tetrahedron being defined by one of the known data points;

means including said microprocessor for determining if the given data point lies within the tetrahedron; and means for indicating a classification of the given data point depending on whether the given data point lies within the tetrahedron.

35. An apparatus in accordance with claim 34 wherein said means for defining a tetrahedron does so without limiting the size of the tetrahedron.

36. An apparatus in accordance with claim 35 and further comprising means for calculating the respective standard deviations for each of the parameters for all the data points in the population, and wherein said means for defining a tetrahedron does so such that, for each of the parameters, each of the vertices of the tetrahedron is within a predetermined distance from the given data point, the predetermined distance for each of the parameters being a function of the standard deviation calculated for the parameter by said standard deviation calculating means.

37. An apparatus in accordance with claim 34 and further comprising means for defining the given data point by measuring the three parameters for the given data point.

38. An apparatus in accordance with claim 37 wherein said means for measuring the three parameters for the given data point comprises means for measuring three parameters relating to color.

39. An apparatus in accordance with claim 38 wherein the three parameters consist of a red/green parameter (a*), a yellow/blue parameter (b*), and a lightness parameter (L*).

40. An apparatus in accordance with claim 39 wherein said means for measuring the three parameters comprises a measuring apparatus selected from the group consisting of a colorimeter, a spectrophotometer, and an abridged spectrophotometer.

41. An apparatus in accordance with claim 34 and further comprising means for determining if the given data point is in close proximity to any of the known data points.

42. An apparatus in accordance with claim 41 wherein said means for determining if the given data point is in close proximity to any of the known data points comprises means for calculating the respective standard deviations for each of the parameters for all of the known data points and for defining the given data point as being in close proximity to a selected one of the known data points if, for each of the parameters, the given data point is within a predetermined distance from the selected one of the known data points, the predetermined distance for each of the parameters being a function of the calculated standard deviation for the parameter.

43. An apparatus in accordance with claim 41 wherein said means for determining if the given data point is in the neighborhood of any of the known data points comprises means for determining which of the known data points is closest to the given data point, means for defining an ellipsoidal neighborhood around the closest data point, and means for determining if the given data point is in the ellipsoidal neighborhood.

44. An apparatus as set forth in claim 34 wherein said indicating means includes means for indicating that the sample falls within the population if the given data point lies within the tetrahedron.

45. An apparatus as set forth in claim 34 wherein said indicating means includes means for classifying the sample as "acceptable" if the given data point lies within the tetrahedron.

46. An apparatus for classifying a sample having at least three parameters by determining if the sample falls within a population defined by more than four known data points, each data point having the three parameters, said apparatus comprising:

means for measuring the three parameters for the sample, and defining a given data point using the measured three parameters;

a microprocessor;

means including said microprocessor for defining a plurality of tetrahedrons, each of the tetrahedrons having four vertices, each of the vertices of each tetrahedron being defined by one of the known data points;

means including said microprocessor for determining if the given data point falls within any of the plurality of tetrahedrons; and means for outputting a classification of the sample depending on whether said determining means determines that the given data point falls within any of the plurality of tetrahedrons.

47. An apparatus in accordance with claim 46 and further comprising means for determining if the given data point is in close proximity to any of the known data points.

48. An apparatus in accordance with claim 47 wherein said means for determining if the given data point is in close proximity to any of the known data points comprises means for calculating the respective standard deviations for each of the parameters for all of the known data points and for defining the given data point as being in close proximity to a selected one of the known data points if, for each of the parameters, the given data point is within a predetermined distance from the selected one of the known data points, the predetermined distance for each of the parameters being a function of the calculated standard deviation for the parameter.

49. An apparatus in accordance with claim 47 wherein said means for determining if the given data point is in close proximity to any of the known data points comprises means for determining which of the known data points is closest to the given data point, means for defining an ellipsoidal neighborhood around the closest data point, and means for determining if the given data point is in the ellipsoidal neighborhood.

50. An apparatus as set forth in claim 46 wherein said outputting means includes means for indicating that the sample falls within the population if the given data point lies within any of the tetrahedrons.

51. An apparatus as set forth in claim 46 wherein said outputting means includes means for classifying the sample as "acceptable" if the given data point lies within any of the tetrahedrons.

52. An apparatus for classifying a sample having a predetermined number n of parameters by determining if the sample falls within a population defined by at least n+1 known data points, each known point having the n parameters, n being at least 2, said apparatus comprising:
    a measuring apparatus for measuring the n parameters of the sample to define a given data point;
    a microprocessor;
    means, including said microprocessor, for defining a triangle having three vertices, each of the vertices of the triangle being defined by two of the parameters of respective ones of the known data points, the same two parameters being used to define each of the vertices;
    means, including said microprocessor, for determining if the given data point lies within the triangle with regard to the same two parameters; and
    display means, in communication with said determining means, for visually indicating a classification of the sample depending on whether said determining means determines that the given data point lies within the triangle.

53. An apparatus in accordance with claim 52 and further comprising means for determining if the given data point is in close proximity to any of the known data points.

54. An apparatus in accordance with claim 53 wherein said means for determining if the given data point is in close proximity to any of the known data points comprises means for calculating the respective standard deviations for each of the parameters for all of the known data points and for defining the given data point as being in close proximity to a selected one of the known data points if, for each of the parameters, the given data point is within a predetermined distance from the selected one of the known data points, the predetermined distance for each of the parameters being a function of the calculated standard deviation for the parameter.

55. An apparatus in accordance with claim 53 wherein said means for determining if the given data point is in close proximity to any of the known data points comprises means for determining which of the known data points is closest to the given data point, means for defining a neighborhood around the closest data point, the neighborhood being elliptical with regard to the same two parameters, and means for determining if the given data point is in the elliptical neighborhood with regard to the same two parameters.

56. An apparatus as set forth in claim 52 wherein said display means includes means for indicating that the sample falls within the population if the given data point lies within the triangle.

57. An apparatus as set forth in claim 52 wherein said display means includes means for classifying the sample as "acceptable" if the given data point lies within the triangle.

58. An apparatus for determining if a sample having a predetermined number n of parameters, falls within a population defined by at least n+1 known data points, each known data point having the n parameters, said apparatus comprising:
    means for determining the n parameters of said sample;
    a microprocessor;
    means including said microprocessor for defining a first vector from the given data point to a point on a surface defined by n data points of the n+1 known data points;
    means including said microprocessor for determining the component of the first vector along the normal to the surface defined by the n data points;
    means including said microprocessor for defining a second vector from the n+1 data point to the surface defined by the n data points;
    means including said microprocessor for calculating the dot product of the component of the first vector along the normal and the second vector;
    means including said microprocessor for determining whether the calculated dot product is positive or negative; and
    means indicating that whether on not said sample falls within said population of known data points depending on whether said calculated dot product is positive or negative.

59. An apparatus for determining if a sample having at least three parameters falls within a population defined by at least four known data points, each known data point having the three parameters, said apparatus comprising:
    means for establishing the three parameters for the sample;
    a microprocessor;
    means including said microprocessor for determining which of the known data points is closest to the given data point;
    means including said microprocessor for defining an ellipsoidal neighborhood around the closest data point;
    means including said microprocessor for determining if the given data point is in the ellipsoidal neighborhood; and
    means for visually indicating that the sample falls within the population if said determining means determines that the given data point is in the ellipsoidal neighborhood.

60. An apparatus in accordance with claim 59 wherein said means for establishing the three parameters for the given data point comprises means for measuring three parameters relating to color.

61. An apparatus in accordance with claim 60 wherein the three parameters consist of a red/green parameter (a*), a yellow/blue parameter (b*), and a lightness parameter (L*).

62. An apparatus in accordance with claim 61 wherein said means for establishing the three parameters comprises a measuring apparatus selected from the group consisting of a colorimeter, a spectrophotometer, and an abridged spectrophotometer.

63. An apparatus for determining if a given data point representing sensed color and having three parameters should be considered to be "acceptable", said apparatus comprising:

a measuring apparatus for measuring the three parameters for the given data point, said measuring apparatus being selected from the group consisting of a colorimeter, a spectrophotometer, and an abridged spectrophotometer, the three parameters being color parameters;

an analog to digital converter electrically connected to said measuring apparatus and defining the given data point, in digital form, when said analog to digital converter converts the measured three parameters;

a computer including a random access memory, and means defining a database containing a first population of at least four data points that each represent a color known to have been classified as "acceptable", and containing a second population of data points that each represent a color known not to have been classified as "acceptable";

said computer including means using said random access memory for determining which of the data points of the second population is closest to the given data point;

said computer including means using said random access memory for defining an ellipsoidal neighborhood around the closest data point of the second population;

said computer including means using said random access memory for determining if the given data point is in the ellipsoidal neighborhood around the closest data point of the second population;

means for visually indicating that the given data point can not be automatically considered to be "acceptable" if the given data point is in the ellipsoidal neighborhood around the closest data point of the second population;

said computer including means using said random access memory for determining which of the data points of the first population is closest to the given data point;

said computer including means using said random access memory for defining an ellipsoidal neighborhood around the closest data point of the first population;

said computer including means for determining if the given data point is in the ellipsoidal neighborhood defined around the closest data point of the first population;

means for visually indicating that the given data point can automatically be considered "acceptable" if the given data point is in the ellipsoidal neighborhood defined around the closest data point of the first population;

said computer including means using said random access memory for determining if the given data point falls within any of a plurality of tetrahedrons, each of the tetrahedrons having four vertices, each of the vertices of each tetrahedron being defined by one of the data points of the first population;

means for visually indicating that the given data point can be automatically considered "acceptable" if the given data point falls within any of the plurality of tetrahedrons, wherein each of the tetrahedrons has four vertices, and wherein each of the vertices of each tetrahedron is defined by one of the data points of the first population; and means for visually indicating that the given data point can not be automatically considered to be "acceptable" if the given data point does not fall within any of the plurality of tetrahedrons, wherein each of the tetrahedrons has four vertices, and wherein each of the vertices of each tetrahedron is defined by one of the data points of the first population.

64. An apparatus in accordance with claim 63 wherein said means for determining if the given data point falls within any of a plurality of tetrahedrons does so without limiting the size of any of the tetrahedrons included in the plurality of tetrahedrons.

65. An apparatus in accordance with claim 63 and further comprising means for calculating the respective standard deviations for each of the parameters for all the data points in the first population, and wherein said means for determining if the given data point falls within any of a plurality of tetrahedrons, selects the plurality of tetrahedrons as a subset of all possible tetrahedrons that could be defined using the data points of the first population, each tetrahedron of the subset being defined such that, for each of the parameters, each of the vertices of the tetrahedron is within a predetermined distance from the given data point, the predetermined distance for each of the parameters being a function of the standard deviation calculated for the parameter by said standard deviation calculating means.

66. An apparatus in accordance with claim 63 wherein the three parameters consist of a red/green parameter (a*), a yellow/blue parameter (b*), and a lightness parameter (L*).

\* \* \* \* \*